(12) United States Patent
Bozkurt et al.

(10) Patent No.: US 12,281,253 B2
(45) Date of Patent: *Apr. 22, 2025

(54) SUPER ABSORBING RESIN COMPOSITE WITH BASE MATERIAL FOR IMPROVING SOIL WATER RETENTION

(71) Applicant: Imam Abdulrahman Bin Faisal University, Dammam (SA)

(72) Inventors: Ayhan Bozkurt, Dammam (SA); Omer Aga, Dammam (SA); Huseyin Tombuloglu, Dammam (SA); Ismail Anil, Dammam (SA); Seyda Tugba G. Anil, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 325 days.

This patent is subject to a terminal disclaimer.

(21) Appl. No.: 17/742,973

(22) Filed: May 12, 2022

(65) Prior Publication Data

US 2022/0267674 A1   Aug. 25, 2022

Related U.S. Application Data

(63) Continuation of application No. 16/149,731, filed on Oct. 2, 2018, now Pat. No. 11,352,559.

(51) Int. Cl.
| | |
|---|---|
| *C09K 17/50* | (2006.01) |
| *B01J 20/12* | (2006.01) |
| *B01J 20/16* | (2006.01) |
| *B01J 20/26* | (2006.01) |
| *B01J 20/28* | (2006.01) |
| *B01J 20/32* | (2006.01) |
| *C09K 101/00* | (2006.01) |

(52) U.S. Cl.
CPC ............... *C09K 17/50* (2013.01); *B01J 20/12* (2013.01); *B01J 20/165* (2013.01); *B01J 20/261* (2013.01); *B01J 20/28016* (2013.01); *B01J 20/28059* (2013.01); *B01J 20/28083* (2013.01); *B01J 20/3282* (2013.01); *B01J 2220/68* (2013.01); *C09K 2101/00* (2013.01)

(58) Field of Classification Search
CPC ...... C09K 17/50; C09K 2101/00; B01J 20/12; B01J 20/165; B01J 20/261; B01J 20/28016; B01J 20/28059; B01J 20/28083; B01J 20/3282; B01J 2220/68
USPC ........................................................ 523/132
See application file for complete search history.

(56) References Cited

U.S. PATENT DOCUMENTS

| | | | | |
|---|---|---|---|---|
| 8,256,159 | B2 * | 9/2012 | Spittle | C09K 17/52 |
| | | | | 47/58.1 SC |
| 9,353,009 | B2 | 5/2016 | Dantin et al. | |
| 11,352,559 | B2 * | 6/2022 | Bozkurt | B01J 20/3282 |
| 2011/0113983 | A1 * | 5/2011 | Bernu | C09K 17/50 |
| | | | | 523/132 |
| 2015/0210602 | A1 | 7/2015 | Roa-Espinosa et al. | |
| 2016/0311697 | A1 * | 10/2016 | Hoskins | B01J 20/261 |

FOREIGN PATENT DOCUMENTS

| | | |
|---|---|---|
| CN | 102321486 A | 1/2012 |
| CN | 106348949 A | 1/2017 |
| KR | 10-0880602 B1 | 1/2009 |
| WO | WO 2016/021914 A1 | 2/2016 |

OTHER PUBLICATIONS

Francesco F. Montesano, et al., "Biodegradable Superabsorbent Hydrogel Increases Water Retention Properties of Growing Media and Plant Growth", Agriculture and Agricultural Science Procedia, vol. 4, 2015, pp. 451-458.

* cited by examiner

*Primary Examiner* — Edward M Johnson
(74) *Attorney, Agent, or Firm* — Oblon, McClelland, Maier & Neustadt, L.L.P.

(57) ABSTRACT

A method is described for improving water retention in soil, which involves mixing a super absorbing resin (SAR) composite with the soil. The SAR composite comprises a natural pozzolan and at least one polymer or copolymer. The SAR composite may be in the form of granules having an average longest dimension of 0.2-10 mm, though the SAR composite may be pelletized or formed in other sizes. The SAR composite may release water at a faster rate in a soil when exposed to drought conditions.

18 Claims, 14 Drawing Sheets

SUPER ABSORBING RESIN COMPOSITE WITH BASE MATERIAL FOR IMPROVING SOIL WATER RETENTION

CROSS-REFERENCE TO RELATED APPLICATIONS

The present application is a Continuation of U.S. application Ser. No. 16/149,731, pending, having a filing date of Oct. 2, 2018.

BACKGROUND OF THE INVENTION

Technical Field

The present invention relates to a method of improving water retention in soil by mixing the soil with a super absorbing resin composite that comprises one or more polymers and a natural pozzolan.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Every living thing on the earth is at least partially made of water. Without doubt, water is vital for all living organisms. The available quantity and quality of water resources significantly affects the development, economy, and environment of all countries. Climatic conditions dominate the temporal and spatial distribution of freshwater resources of the world. Tropical and temperate regions receive abundant volumes of water by precipitation while arid and semi-arid climatic zones have been experiencing an acute shortage of water resources. The average temperature of the earth is projected to increase 1.4-5.8° C. by 2100 due to the global warming, which may further affect the availability and quality of water.

The availability and quality of fresh water have always been a major apprehension in Arabian Peninsula, which is one of the regions of the world with the lowest natural water resources per capita. Only 1.1% of the world's total renewable water resources are located in a region covering almost 5% of the world's land area. In the history of this region, the lives and livelihood of residents have been influenced by water scarcity. In the near future, the water resources of the region remain under stress due to population growth and urbanization, socio-economic development, and agricultural activities. The zone where the Arabian Peninsula is located is arid or extremely arid. The majority of the zone is mostly desert with the exception of mountain chains and coastal areas. The absence of surface water sources (such as rivers and lakes), the groundwater salinity, limited rainfall, and limited renewable groundwater resources are typical hydrological characteristics of the region. In addition to these, the water resources of the region are especially drought-sensitive. The average annual precipitation varies between 70 and 130 mm. The total annual evaporation in the inland and the coastal areas are between 4500 mm and 2500 mm, respectively. The large deep aquifers containing non-renewable fossil water supplies have a limited lifetime and quality. Only Saudi Arabia has satisfactory non-renewable groundwater in deep aquifers with an amount of 430 billion m$^3$. Nevertheless, these have quickly been depleted.

Saudi Arabia receives largely unbroken sunshine for the whole year due to high pressure systems and stable descending air, which is dominated by the subtropical ridge. The temperature is rarely below 7° C. or above 46° C. and usually differs from 11° C. to 44° C. with an annual average of 28° C. The hot season is between mid-May and end of September while the cool season lasts from December to mid-March. Relative humidity is lowest in the hot season (Avg. 38±7%) and highest during cool season (Avg. 63±6%). Rainy season continues from mid-October to mid-May with an average annual precipitation total of 100 mm. Accordingly, the arid precipitation regime, hot desert climate, and high evapotranspiration of the region causes water scarcity and reduced vegetation. Only 2% of the country's land area is considered arable. Renewable water availability in the country is 90 m$^3$/capita-year which is quite below the severe water-scarcity threshold value of 500 m$^3$/capita-year.

Nowadays, the average annual water demand of Saudi Arabia, 280 m$^3$/capita, is provided by the combination of non-renewable groundwater sources, seawater desalination, renewable groundwater and surface water sources, and treated wastewater. In the event of precipitation, surface water due to flash flooding is stored in more than 200 dams which are used as water reservoirs. The current water consumption share by sectors is agriculture 71%, domestic 24%, and industry 5%, respectively. With the limited recharge, renewable water sources can supply only 30% of water consumption. For this reason, the rest of the water demand is provided equally by non-renewable groundwater sources and expensive water desalination treatment technologies. The Kingdom of Saudi Arabia pays exorbitant sums of money to provide water for residents at low prices. This makes it the most expensive water globally. The updated water tariff can cover only 30 percent of the actual water costs to the Kingdom of Saudi Arabia. According to the future projections, both renewable and non-renewable groundwater sources may totally be depleted within 50 years at the current rate of water withdrawal.

Various mitigation and adaptation practices have been engaged by Saudi Arabia Government to cope with the depletion of natural water resources and the adverse effects of climate change on the availability and quality of water. These practices include: i) public awareness on climate change and water conservation, ii) encouraging consumers (domestic, industrial, agricultural) to conserve water and power resources, iii) recycling of treated sewage wastewater, iv) realistic water tariffs to minimize water misuse, v) implementation of modernized water legislations, and vi) developing integrated water-resource management. However, additional serious efforts are required. The development and application of appropriate emerging technologies targeting to be a solution of the water-related problems and concerns can provide a sustainable key of the situation.

The selection, development, and application of the new technologies in order to optimize and improve agricultural water use with significant savings is essential to cope with the limited/diminishing water sources since the highest water withdrawal demanding sector is agriculture accounting for more than 70% of total water demand. The development and application of super absorbing resins (SARs) is one of the emerging strategies in this regard. SARs are hydrophilic materials that may absorb and hold 1000 times more water than their weight. Basically, water and nutrients can be stored by SARs, and then they can be released in a drought stress condition, which is a plant-growth limiting factor, especially in arid regions. In this way, a satisfactory crop and biologic yield could be achieved with less irrigation water usage.

In view of that, the purpose of this project proposal is the production and application of novel materials to hold and conserve water in a desert environment, which is a vital and a novel approach to overcome the depletion of natural water resources and the adverse effects of climate change on the availability and quality of water in arid regions. To achieve this, a series of grafted biopolymer composite super absorbing resins (SARs) based on biopolymers including functional minerals are produced. The water holding capacities of the SARs may be controlled by cross-link density and contents of functional minerals. Fourier transform infrared spectroscopy (FT-IR), thermogravimetric analysis (TGA), differential scanning calorimeter (DSC), scanning electron microscope (SEM), transmission electron microscope (TEM) are employed in order to characterize the structure and morphologies of the SARs. The effects of each SAR on plant growth and development may be confirmed by analyzing growth rate and physiological status of plants. Functional minerals that are already available in Saudi Arabia region may also be utilized for the improving soil water retention.

In view of the forgoing, one objective of the present invention is to provide a method of improving water retention in soil, which involves mixing in a super absorbing resin (SAR) composite, which comprises a natural pozzolan and a polymer.

BRIEF SUMMARY OF THE INVENTION

According to a first aspect, the present disclosure relates to a method of improving water retention in a soil. The method involves mixing a super absorbing resin (SAR) composite with the soil. The SAR composite comprises a natural pozzolan, and at least one polymer or copolymer selected from the group consisting of cellulose, chitosan-alginic acid, chitosan, poly 2-acrylamido-2-methylpropane-sulfonic acid (polyAMPS), polyacrylamide, polyacrylic acid, and sodium alginate.

In one embodiment, the SAR composite comprises the natural pozzolan at a weight percentage of 30-50 wt %, relative to a total weight of the SAR composite.

In one embodiment, the SAR composite is present at a weight percentage of 0.1-5.0 wt % relative to a weight of the soil.

In one embodiment, the SAR composite is in the form of granules having an average longest dimension of 0.2-10 mm.

In one embodiment, the SAR composite comprises 30-40 wt % polyacrylic acid, 10-25 wt % polyacrylamide, and 40-50 wt % natural pozzolan, each relative to a total weight of the polyacrylic acid, polyacrylamide, and natural pozzolan, and the SAR composite does not comprise cellulose.

In one embodiment, the granules are surface cross-linked.

In one embodiment, the natural pozzolan is at least one selected from the group consisting of metakaolin, calcined shale, calcined clay, volcanic glass, zeolitic trass, zeolitic tuff, tuffs, rice husk ash, diatomaceous earth, and calcined shale.

In one embodiment, the SAR composite is porous with an average pore radius of 1.5-20 nm and a specific surface area of 2-10 m$^2$/g.

In one embodiment, the soil comprises at least one of a plant, seedling, root, and seed.

In a further embodiment, a growth of the at least one plant, seedling, root, or seed in the soil is improved compared to an essentially identical plant seedling, root or seed in a second soil that was not mixed with the SAR composite.

In one embodiment, the soil comprises a plant, and the plant is a turf grass or a food crop.

In one embodiment, the SAR composite further comprises water at a weight percentage of 20-80 wt % relative to a total weight of the SAR composite dry weight and water.

In one embodiment, the SAR composite releases water at an average rate of 5-90 mL water per kg SAR composite per day.

In one embodiment, the at least one polymer or copolymer is cross-linked and has a cross-link density of 100-5,000 mol/cm$^3$.

In one embodiment, the SAR composite further comprises at least one selected from the group consisting of a plant fertilizer, a mineral, a plant growth hormone, a pesticide, and a fungicide.

In a further embodiment, the SAR composite releases water and the at least one plant fertilizer, mineral, plant growth hormone, pesticide, or fungicide at an average rate of 5-90 mL water per kg SAR composite per day.

In one embodiment, the SAR composite further comprises a zeolite.

In one embodiment, the SAR composite further comprises a layered double hydroxide.

In one embodiment, the SAR composite releases water at a rate faster by a factor of 1.2-10 at a relative humidity of 0-35% than an essentially similar SAR composite at a relative humidity of 55-80%.

In one embodiment, the SAR composite releases water at a rate faster by a factor of 1.2-10 at a temperature of 32-45° C. than an essentially similar SAR composite at a temperature of 10-25° C.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1A:
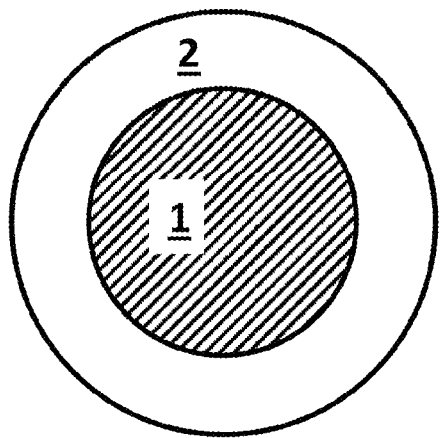
FIG. 1A is a cross-section view of a granule of a SAR composite having a core-shell structure.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

The present disclosure is intended to include all hydration states of a given compound or formula, unless otherwise noted or when heating a material. For example, $Ni(NO_3)_2$ includes anhydrous $Ni(NO_3)_2$, $Ni(NO_3)_2 \cdot 6H_2O$, and any other hydrated forms or mixtures. $CuCl_2$ includes both anhydrous $CuCl_2$ and $CuCl_2 \cdot 2H_2O$.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}C$ and $^{14}C$. Isotopes of nitrogen include $^{14}N$ and $^{15}N$. Isotopes of oxygen include $^{16}O$, $^{17}O$, and $^{18}O$. Isotopes of nickel include $^{58}Ni$, $^{60}Ni$, $^{61}Ni$, $^{62}N$, and $^{64}Ni$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

According to a first aspect, the present disclosure relates to a method of improving water retention in a soil. This method involves mixing a super absorbing resin (SAR) composite with the soil. The SAR composite comprises a natural pozzolan and a polymer.

As defined here, "improving water retention in a soil," means that either the soil is able to hold more water, or reduce evaporation loss, or both.

In one embodiment, improving water retention in a soil means that the amount of water lost from the soil due to evaporation is reduced, preferably reduced by at least 20 wt %, more preferably reduced by at least 40 wt %, even more preferably reduced by at least 50 wt % relative to a weight of water lost from an essentially identical soil in an identical environment and over the same amount of time, and starting with the same total mass of water. In another embodiment, over a period of 3-10 days, preferably 5-8 days, the reduction in water lost due to evaporation may be by 10-90 wt %, preferably by 20-80 wt %, more preferably by 30-70 wt %, though reductions of less than 10 wt % or greater than 90 wt % may be possible. In some embodiments, where a soil is treated to reduce water loss from evaporation, the diffusion of water from a soil with an improved water retention to neighboring drier soil may also be reduced.

In one embodiment, improving water retention in a soil means that the water absorption capacity of a soil is increased. In one embodiment, a soil volume that has been saturated with water and has an improved water retention is able to hold at least 20 wt % more, preferably at least 40 wt % more, even more preferably at least 50 wt % more water relative to a total weight of the water of an essentially identical saturated soil volume that does not have improved water retention. In one embodiment, the soil volume with the improved water retention is able to hold 5-90 wt % more water, preferably 20-70 wt % more, more preferably 35-60 wt % more. In other embodiments, the soil volume with the improved water retention is able to hold 1-100 times more water, preferably 2-20 times more, more preferably 3-10 times more. However, depending on the amount of SAR composite added to a soil, a soil having improved water retention may possibly be able to hold greater than 100 times more water. In some embodiments, a plant may be grown directly in the SAR composite, without using soil, leading to water retention characteristics that are greater than most mixtures of soil and SAR composite.

In one embodiment, the SAR composite, and/or the polymer of the SAR composite, may be considered a super absorbing resin or polymer. A super absorbing resin or polymer may also be known as a "superabsorbent" resin or polymer. As used herein, a "resin" refers to a solid or highly viscous substance or polymeric macromolecule containing polymers, preferably with reactive groups.

As used herein a "polymer" refers to a large molecule, or macromolecule, of many repeating subunits and/or substances composed of macromolecules. As used herein a "monomer" refers to a molecule or compound that may bind chemically to other molecules to form a polymer. As used herein the term "repeat unit" or "repeating unit" refers to a part of the polymer or resin whose repetition would produce the complete polymer chain (excluding the end groups) by linking the repeat units together successively along the chain. The process by which monomers combine end to end to form a polymer is referred to herein as "polymerization," monomers are molecules which can undergo polymerization, thereby contributing constitutional repeating units to the essential structures of a macromolecule or polymer. As used herein a "copolymer" refers to a polymer derived from more than one species of monomer and are obtained by the "copolymerization" of more than one species of monomer. Copolymers obtained by copolymerization of two monomer species may be termed bipolymers, those obtained from three monomers may be termed terpolymers and those obtained from four monomers may be termed quaterpolymers, etc. As used herein a "cyclopolymer" refers to a polymer having cyclic structures in the main polymer chain (i.e. the polymer backbone) and are obtained by the "cyclopolymerization" of appropriate monomers where one or more cyclic or ring structures, heterocyclic or homocyclic, are formed. In many cases, the cyclic structures may be formed during the cyclopolymerization which may proceed by an alternating intra-intermolecular chain mechanism for polymerization. As used herein a "cyclocopolymer" refers to a polymer sharing the definition of a copolymer and a cyclopolymer and may be formed by "cyclocopolymerization." As used herein, "cross-linking" or a "cross-link" refers to polymers and resins containing branches that connect polymer chains via bonds that link one polymer chain to another. The cross-link may be an atom, a group of atoms, or a number of branch points connected by bonds, groups of atoms, or polymer chains. In the majority of cases, a cross-link is a covalent structure or covalent bond, but the term may also describe sites of weaker chemical interactions, portions of crystallites, and even physical interactions and entanglements. The cross-linking can alter the physical and mechanical properties of the polymer. Cross-linking may be formed by chemical reactions that are initiated by heat, pressure, change in pH, and/or radiation, with or without the presence of a cross-linking agent and/or catalyst.

Since a copolymer consists of at least two types of constituent units (structural units), copolymers may be classified based on how these units are arranged along the chain. Alternating copolymers are copolymers consisting of macromolecules comprising two species of monomeric units in a regular alternating sequence. An alternating copolymer may be considered as a homopolymer derived from an implicit or hypothetical monomer. A periodic copolymer is a copolymer which has two species of monomeric units arranged in a repeating sequence. A statistical copolymer is a copolymer in which the sequence of monomeric units follows a statistical rule. Alternatively if the probability of finding a specific monomeric unit at a particular point in the chain is equal to the mole fraction of that monomeric unit in the chain, then the polymer may be referred to as a truly random copolymer. In gradient copolymers the monomer composition changes gradually along the chain. The cross-linked polymer resin of the present disclosure may be an alternating copolymer, a periodic copolymer, a statistical copolymer, a random copolymer, or mixtures thereof.

Copolymers may also be described in terms of the existence of or arrangement of branches in the polymer structure. Linear copolymers consist of a single main chain whereas branched copolymers consist of a single main chain with one or more polymeric side chains. The cross-linked polymer resin of the present disclosure may be a linear copolymer, a branched copolymer, or some other special type of branched copolymers including star copolymers, brush copolymers, comb copolymers, and mixtures thereof.

A block copolymer is a specific type of copolymer made up of blocks of different polymerized monomers. In a block copolymer, a portion of the macromolecule comprising many constitutional units has at least one feature which is not present in the adjacent portions. Block copolymers comprise two or more homopolymer subunits linked by covalent bonds. The union of the homopolymer subunits may require an intermediate non-repeating subunit, known as a junction block. Block copolymers with two or three distinct blocks are called diblock copolymers and triblock copolymers respectively, tetrablocks and multiblocks, etc. can also be fabricated. In stereoblock copolymers a special structure can be formed from one monomer where the distinguishing feature is the tacticity of each block. The at least one polymer or copolymer of the present disclosure may be a block copolymer, a stereoblock copolymer, or mixtures thereof.

A superabsorbent resin is a cross-linked partially neutralized polymer that is capable of absorbing large amounts of aqueous liquids with swelling and the formation of hydrogels, and of retaining the liquids under a certain pressure in accordance with the general definition of superabsorbent material. Superabsorbent polymer compositions may include post-treatment of the superabsorbent polymer such as surface cross-linking, surface treatment, and other treatment. Superabsorbent polymer particles are particles of superabsorbent polymers or superabsorbent polymer compositions. The acronym SARs may be used in place of superabsorbent polymer, superabsorbent polymer composition, and particles herein. A comprehensive survey of superabsorbent polymers, and their use and manufacture, is given in F. L. Buchholz and A. T. Graham (editors) in "Modern Superabsorbent Polymer Technology," Wiley-VCH, New York, 1998—incorporated herein by reference in its entirety.

Superabsorbent resins can absorb and retain extremely large amounts of a liquid relative to their own mass. Superabsorbent resins that absorb water may be classified as hydrogels, and may be able to absorb aqueous solutions through hydrogen bonding with water molecules. A SAR's ability to absorb water may also depend on the ionic concentration of the aqueous solution. In deionized and distilled water, a SAR may absorb 300 times its weight (from 30 to 60 times its own volume) and can become up to 99.9% liquid, but when put into a 0.9% saline solution, the absorbency drops to approximately 50 times its weight. The presence of valence cations in the solution may impede the SAR's ability to bond with the water molecule.

The total absorbency and swelling capacity may be controlled by the type and degree of cross-linkers used to make the SAR. Low-density cross-linked SARs generally have a higher absorbent capacity and swell to a larger degree. These types of SARs also have a softer and stickier gel formation. High cross-link density polymers exhibit lower absorbent capacity and swell, but the gel strength is firmer and can maintain particle shape even under modest pressure.

Superabsorbent polymers are commonly made from the polymerization of acrylic acid blended with sodium hydroxide in the presence of an initiator to form a poly-acrylic acid sodium salt (sometimes referred to as sodium polyacrylate). This polymer is common in the SARs made in the world today. Other materials are also used to make a superabsorbent polymer, such as polyacrylamide copolymer, ethylene maleic anhydride copolymer, cross-linked carboxymethylcellulose, polyvinyl alcohol copolymers, cross-linked polyethylene oxide, and starch grafted copolymer of polyacrylonitrile, to name a few. The latter is one of the oldest SARs created. SARs have applications in artificial snow for motion picture and stage productions, candles, composites, laminates, controlled release of insecticides and herbicides, diapers and incontinence garments, as a drown-free water source for feeder insects, filtration applications, fire-retardant gel, flood control, as a fragrance carrier, as frog tape (high tech masking tape designed for use with latex paint), in fuel monitoring systems in aviation and vehicles, grow-in-water toys, hot & cold therapy packs, for magical effects, medical waste solidification, motionless water beds, paintball, spill control, surgical pads, waste stabilization and environmental remediation, water absorbent pads, water retention for supplying water to plants, wire and cable water blocking, and wound dressings.

In one embodiment, the at least one polymer or copolymer of the SAR composite may be a graft polymer. Graft polymers are segmented copolymers with a linear backbone of one composite and randomly distributed branches of another composite. In other words, graft copolymers are a specific type of branched copolymer in which the side chains are structurally distinct from the main chain. For example, the main chain and side chains may be composed of distinct homopolymers; however, the individual chains of a graft copolymer may be homopolymers or copolymers. Different copolymer sequencing is sufficient to define a structural difference, thus a diblock copolymer with alternating copolymer side chains may be termed a graft copolymer. Graft polymers used as impact resistant materials, thermoplastic elastomers, compatibilizers, or emulsifiers for the preparation of stable blends or alloys. One of the more well-known examples of a graft polymer is high impact polystyrene, which consists of a polystyrene backbone with polybutadiene grafted chains.

In one embodiment, the at least one polymer or copolymer of the SAR composite may be a biopolymer or derived from a biopolymer. Biopolymers are polymers produced by living organisms; in other words, they are polymeric biomolecules. Since they are polymers, biopolymers contain monomeric units that are covalently bonded to form larger structures. There are three main classes of biopolymers, classified according to the monomeric units used and the structure of the biopolymer formed: polynucleotides (RNA and DNA), which are long polymers composed of 13 or more nucleotide monomers; polypeptides, which are short polymers of amino acids; and polysaccharides, which are often linear bonded polymeric carbohydrate structures. Other examples of biopolymers include rubber, suberin, melanin, and lignin. In one embodiment, the at least one polymer or copolymer of the SAR composite may be a graft biopolymer.

In one embodiment, the SAR composite may comprise at least one polymer or copolymer selected from the group consisting of cellulose, chitosan-alginic acid, chitosan, poly 2-acrylamido-2-methylpropane-sulfonic acid (polyAMPS), polyacrylamide, polyacrylic acid, and sodium alginate. Other polymers, such as those previously listed, as biopolymers and polymers, may also be used in the SAR composite.

The degree of polymerization (DP) is defined as the number of monomeric units in a macromolecule or polymer. In one embodiment, the at least one polymer or copolymer has a degree of polymerization of 100-2500, preferably 100-1500, preferably 100-750, preferably 100-300. In one embodiment, at least one polymer or copolymer of the present disclosure is produced by free radical polymerization, which often results in a wide molecular weight distribution. In one embodiment, the at least one polymer or copolymer of the present disclosure has a weight average molecular weight of 5-200 kDa, preferably 10-150 kDa, preferably 10-100 kDa, preferably 10-75 kDa, more preferably 10-50 kDa, preferably 20-35 kDa.

Dispersity is a measure of the heterogeneity of sizes of molecules or particles in a mixture. The polydispersity index (PDI or heterogeneity index) is a measure of the distribution of molecular mass in a given polymer sample. The PDI is calculated as the weight average molecular weight divided by the number average molecular weight. Typically, dispersities vary based on the mechanism of polymerization and can be affected by a variety of reaction conditions such as reactant ratios, how close the polymerization went to completion, etc. Generally, a decreasing molecular weight distribution increases water solubility and increases flexibility; it can further affect properties including crystallizability, adhesion, mechanical strength, and diffusivity. In one embodiment, the at least one polymer or copolymer of the present disclosure has a PDI of at least 1 and up to 6, preferably up to 5, preferably up to 3, preferably up to 2.5, preferably up to 2, preferably up to 1.5, preferably up to 1.25.

As mentioned previously, the SAR composite also comprises a natural pozzolan. In one embodiment, the natural pozzolan is at least one selected from the group consisting of metakaolin, calcined shale, calcined clay, volcanic glass (for instance, perlite, tachylite, etc.), zeolitic trass or tuffs, rice husk ash, diatomaceous earth, and calcined shale. In one embodiment, the SAR composite may comprise two or more pozzolans, for instance, in a further embodiment, the SAR composite may comprise calcined shale and calcined clay at a weight ratio of 100:1-1:100, preferably 10:1-1:10, more preferably 2:1-1:2.

Pozzolans are a class of siliceous or siliceous and aluminous materials which, in themselves, possess little or no cementitious value but which may, in finely divided form and in the presence of water, react chemically with calcium hydroxide at ordinary temperature to form compounds possessing cementitious properties. The general definition of a pozzolan embraces a large number of materials which vary widely in terms of origin, composition, and properties. Both natural and artificial materials show pozzolanic activity and are used as supplementary cementitious materials. Artificial pozzolans can be produced deliberately, for instance by thermal activation of kaolin-clays to obtain metakaolin, or can be obtained as waste or by-products from high-temperature process such as fly ashes from coal-fired electricity production. In one embodiment, an artificial pozzolan may be used instead of a natural pozzolan. The most commonly used pozzolans today are industrial by-products such as fly ash, silica fume from silicon smelting, highly reactive metakaolin, and burned organic matter residues rich in silica, such as rice husk ash.

Natural pozzolans are abundant in certain locations and are extensively used as an addition to Portland cement.

Volcanic ashes and pumices largely composed of volcanic glass are commonly used, as are deposits in which the volcanic glass has been altered to zeolites by interaction with alkaline waters. Non-limiting examples of natural pozzolans include metakaolin, calcined shale, calcined clay, volcanic glass, zeolitic trass or tuffs, rice husk ash, diatomaceous earth, and calcined shale. In a preferred embodiment, a natural pozzolan meets the standard specification ASTM C618. In one embodiment, the natural pozzolan comes from a deposit in Saudi Arabia.

In one embodiment, the SAR composite may comprise the pozzolan at 10-70 wt %, preferably 20-60 wt %, more preferably 30-50 wt %, even more preferably 35-45 wt %, relative to a total weight of the SAR composite. However, in other embodiments, the pozzolan may be present at less than 10 wt %, for instance, 8-10 wt %, 6-8 wt %, 4-6 wt %, 2-4 wt % or less than 2 wt %. In other embodiments, the pozzolan may be present at more than 70 wt %, for instance, 70-75 wt %, 75-80 wt %, 80-85 wt %, 85-90 wt %, 90-95 wt %, or greater than 95 wt %.

In one embodiment, the SAR composite may comprise the SAR at 30-90 wt %, preferably 40-80 wt %, more preferably 50-70 wt %, even more preferably 55-65 wt %, relative to a total weight of the SAR composite. However, in other embodiments, the SAR may be present at less than 30 wt %, for instance, 25-30 wt %, 20-25 wt %, 15-20 wt %, 10-15 wt % or less than 10 wt %. In other embodiments, the SAR may be present at more than 90 wt %, for instance, 90-92 wt %, 92-94 wt %, 94-96 wt %, 96-98 wt %, or greater than 98 wt %.

In one embodiment, the SAR composite may be considered a nanocomposite hydrogel. Nanocomposite hydrogels (NC gels) are nanomaterial-filled, hydrated, polymeric networks that exhibit higher elasticity and strength relative to traditionally made hydrogels. A range of natural and synthetic polymers are used to design nanocomposite network. By controlling the interactions between nanoparticles and polymer chains, a range of physical, chemical, and biological properties can be engineered. The combination of organic (polymer) and inorganic (clay) structure gives these hydrogels improved physical, chemical, electrical, biological, and swelling/de-swelling properties that cannot be achieved by either material alone. Inspired by flexible biological tissues, researchers incorporate carbon-based, polymeric, ceramic and/or metallic nanomaterials to give these hydrogels superior characteristics like optical properties and stimulus-sensitivity which can potentially be very helpful to medical (especially drug delivery and stem cell engineering) and mechanical fields. Nanocomposite hydrogels are not to be confused with nanogel, which is a nanoparticle composed or consisting of a hydrogel.

In one embodiment, the SAR composite may be in the form of granules having an average longest dimension (which may be, for instance, length or diameter) of 0.2-10 mm, preferably 0.5-7 mm, more preferably 1-6 mm, even more preferably 2-5 mm. In one embodiment, the SAR composite may be in the form of granules or particles having an average longest dimension of less than 0.2 mm, for instance, 150-200 µm, 100-150 µm, or 50-100 µm, or less than 50 µm. In another embodiment, the SAR composite may be in the form of granules or particles having an average longest dimension of greater than 10 mm, for instance, 10-12 mm, 12-14 mm, 14-16 mm, 16-18 mm, or greater than 18 mm.

In one embodiment, the SAR composite is porous and has a specific surface area of 40-70 $m^2/g$, preferably 45-65 $m^2/g$, more preferably 50-60 $m^2/g$, even more preferably 54-58 $m^2/g$. Preferably the specific surface area is determined by $N_2$ adsorption-desorption and Brunauer-Emmett-Teller (BET) methods, however, other procedures may be used. In some embodiments, the SAR composite may have a specific surface area of less than 40 $m^2/g$, for instance, less than 5 $m^2/g$, 5-10 $m^2/g$, 10-20 $m^2/g$, 20-30 $m^2/g$, or 30-40 $m^2/g$. In another embodiment, the SAR composite may have a specific surface area of greater than 70 $m^2/g$, for instance, 70-80 $m^2/g$, 80-90 $m^2/g$, 90-100 $m^2/g$, 100-110 $m^2/g$, or greater than 110 $m^2/g$.

In one embodiment, the SAR composite may be in the form of particles or granules having a spherical or substantially spherical shape (i.e., where the sides are rounded or well-rounded) with a sponge-like (i.e., porous) appearance. As defined here, having a substantially spherical shape means that the distance from the particle centroid (center of mass) to anywhere on the particle outer surface varies by less than 30%, preferably by less than 20%, more preferably by less than 10% of the average distance.

In some embodiments, a portion of the particles or granules of SAR composite may be angular (corners sharp and jagged), angular, sub-angular, or sub-rounded and possess a jagged flake-like morphology.

In one embodiment, particles or granules are monodisperse, having a coefficient of variation or relative standard deviation, expressed as a percentage and defined as the ratio of the particle diameter standard deviation ($\sigma$) to the particle diameter mean ($\mu$), multiplied by 100%, of less than 25%, preferably less than 10%, preferably less than 8%, preferably less than 6%, preferably less than 5%. In one embodiment, the particles are monodisperse, having a particle diameter distribution ranging from 80% of the average particle diameter to 120% of the average particle diameter, preferably 85-115%. In another embodiment, the particles are not monodisperse, for instance, they may be considered polydisperse. Here, the coefficient of variation may be greater than 25%, or greater than 37%. In one embodiment, the particles or granules are polydisperse with a particle diameter distribution ranging from 70% of the average particle diameter to 130% of the average particle diameter, preferably ranging from 60-140%, more preferably 50-150%.

In one embodiment, the SAR composite is porous and has an average pore radius of 1.5-20 nm, preferably 1.8-10 nm, more preferably 2.2-5 nm, or about 2.7 nm. However, in some embodiments, the average pore radius may be smaller than 1.5 nm or greater than 20 nm. The average pore radius may be determined by Brunauer-Emmett-Teller (BET) analysis. In one embodiment, the average pore radius of the SAR composite may be 10-95% greater, preferably 30-80% greater, more preferably 55-75% greater, or about 64% greater than the pozzolan used in the SAR composite, relative to the average pore radius of the pozzolan.

In one embodiment, a SAR composite may comprise a range of pore diameters, and may further comprise both mesopores and micropores. As defined here, mesopores are pores having diameters between 2 and 50 nm; micropores are pores having a diameter of less than 2 nm; and macropores refers to pores having diameters larger than 50 nm. A SAR composite may have a micropore surface area of 5-30 $m^2/g$, preferably 15-25 $m^2/g$; a mesopore surface area of 10-30 $m^2/g$, preferably 18-28 $m^2/g$; a micropore volume of 0.01-0.12 $cm^3/g$, preferably 0.06-0.10 $cm^3/g$; a mesopore volume of 0.40-0.65 $cm^3/g$, preferably 0.45-0.62 $cm^3/g$; and a total pore volume of 0.58-0.75 $cm^3/g$, preferably 0.64-0.70 $cm^3/g$.

In one embodiment, the SAR composite is porous and has a Brunauer-Emmett-Teller (BET) specific surface area of 2-10 m$^2$/g, preferably 2.5-7.0 m$^2$/g, more preferably 3.5-4.5 m$^2$/g, or about 3.78 m$^2$/g. However, in some embodiments, the specific surface area may be less than 2 m$^2$/g or greater than 10 m$^2$/g. In one embodiment, the specific surface area of the SAR composite may be 2-50% greater, preferably 5-40% greater, more preferably 9-13% greater, or about 11% greater than the specific surface area of the pozzolan used in the SAR composite, relative to the specific surface area of the pozzolan.

In one embodiment, the SAR composite may have a cumulative adsorption pore volume of $1 \times 10^{-3}$ cm$^3$/g to $2 \times 10^{-2}$ cm$^3$/g, preferably $5 \times 10^{-3}$ cm$^3$/g to $1 \times 10^{-2}$ cm$^3$/g, more preferably $7.5 \times 10^{-3}$ cm$^3$/g to $9.2 \times 10^{-3}$ cm$^3$/g, or about $8.14 \times 10^{-3}$ cm$^3$/g. However, in some embodiments, the cumulative adsorption pore volume may be less than $1 \times 10^{-3}$ cm$^3$/g or greater than $2 \times 10^{-2}$ cm$^3$/g. In one embodiment, the cumulative adsorption pore volume of the SAR composite may be 4-50% greater, preferably 8-40% greater, more preferably 15-30% greater, or about 20% greater than the cumulative adsorption pore volume of the pozzolan used in the SAR composite, relative to the cumulative adsorption pore volume of the pozzolan.

Figure 1B:
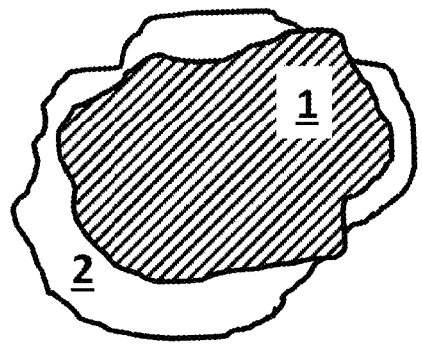
FIG. 1B is a cross-section view of another granule of a SAR composite having a core-shell structure.

In one embodiment, a SAR composite may be in the form of granules with a core-shell structure. Preferably the shell comprises the SAR and the core comprises the pozzolan, however, other arrangements may be possible, such as a particle of SAR decorated with pozzolan, or a SAR composite in the form of granules or particles, comprising micro or nano-domains of SAR and/or pozzolan.

Where the SAR composite may be in the form of granules with a core-shell structure, the ratio of the average shell layer thickness to the average core diameter may be 100:1-1:100, preferably 20:1-1:20, more preferably 5:1-1:5, or even more preferably 3:1-1:3. Preferably at least 70%, more preferably at least 80% of the surface area of the core is in direct contact with the shell layer. In one embodiment, the shell layer may comprise pores that connect with the surface of the core, with the shell layer having a pore size and porosity as those previously described. In one embodiment, the shell layer may be surface cross-linked during or after its formation. FIGS. 1A and 1B show cross-sections of two different embodiments of core-shell structures. FIG. 1A is a more rounded granule than FIG. 1B, and the shell 2 of FIG. 1A completely encapsulates the core 1. In FIG. 1B, part of the core 1 is exposed as the shell layer 2 does not completely cover the entire surface of the core.

Figure 2A:
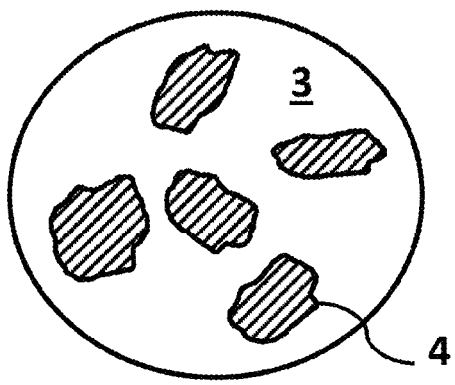
FIG. 2A is a cross-section view of a SAR composite having embedded domains of pozzolan.
Figure 2B:
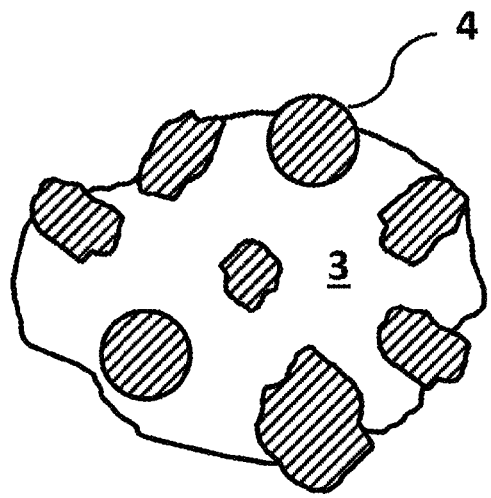
FIG. 2B is another cross-section view of a SAR composite having embedded domains of pozzolan.

In one embodiment, as mentioned previously, the SAR composite may be in the form of granules or particles comprising micro or nano-domains of SAR and/or pozzolan. For instance, these micro or nano-domains may have an average longest diameter of 20 nm-400 μm, preferably 100 nm-100 μm, more preferably 500 nm-50 μm. However, the size of these domains may be larger, depending on the overall size and shape of the SAR composite. In one embodiment, the SAR composite may be in the form of domains of pozzolan embedded a matrix of SAR. In an alternative embodiment, the SAR composite may be in the form of domains of SAR embedded in pozzolan. FIGS. 2A and 2B show cross-sections of two different embodiments of domains of pozzolan 4 being embedded in a matrix of SAR 3. In one embodiment, the total volumes of pozzolan and SAR may be similar, and it may not be clear if one is embedded in a matrix of the other, or vice versa. A SAR composite having micro or nanodomains may be in the form of a granule, or may be formed into pellets, discs, spikes, or other shapes. In addition, a SAR composite having micro or nanodomains may have those micro or nanodomains in any shape previously described for granules and particles. In some embodiments, the domains may be generally encapsulated in the matrix, as shown in FIG. 2A. However, in other embodiments, some domains may be exposed, as shown in FIG. 2B.

In one embodiment, the pozzolan within the SAR composite may have an average particle size or diameter of 0.5-10 μm, preferably 0.8-8 μm, more preferably 1-5 μm, though in some embodiments, the pozzolan may have an average particle size or diameter of less than 0.5 μm or greater than 7 μm. An example of a pozzolan that may be used in the SAR composite is shown in the SEM image of FIG. 3.

Besides granules, the SAR composite may be made into a variety of forms. In another embodiment, a SAR composite may be formed, and then shaped into pellets or larger granules with a narrow dispersity, for instance, pellets or larger granules being monodisperse as described previously for particles or granules being monodisperse. Thus, in one embodiment of the method, the SAR composite may be formed by pelletizing.

In one embodiment, a starting SAR composite is pelletized, ground, and sieved to produce granules or pellets of uniform diameter. In another embodiment, only the SAR or only the pozzolan is pelletized, ground, or sieved. Preferably the SAR composite is in a dried state when ground. The pelletizing may produce pellets which are defined here as self-sustaining solids that retain at least 25% of the surface area per mass of the starting SAR composite. The pelletizing may be done with a rotary drum pelletizer, a pan pelletizer, or a pellet press, and the SAR composite may be subjected to pressures of 10-6000 psi, preferably 100-5,000 psi, more preferably 500-3,000 psi. The pellets may have an average longest diameter of 3-20 mm, preferably 4-15 mm, and an average shortest diameter of 1-10 mm, preferably 2-8 mm. However, in some embodiments, the longest diameter may be shorter than 3 mm or greater than 20 mm, and the shortest diameter may be less than 1 mm or greater than 10 mm. Preferably the pellets are formed in a prismatic shape, such as a cylinder or a rectangular prism, though in other embodiments, the pellets may be formed into spherical or hemispherical shapes.

In another embodiment, the starting SAR composite may be pressed together into one single solid, such as a disc or cylinder, or a spike, rather than individual pellets. The grinding may be with a mortar and pestle, a burr mill, a blade grinder, sandpaper, a ball mill, a disc mill, a jet mill, a conical mill, a hammer mill, or some other milling or grinding machine.

In another embodiment, the pelletizing and grinding is performed in order to increase the population of granules or particles having a particle size between 0.2-10 mm, preferably 0.5-7 mm, more preferably 1-6 mm, as mentioned previously for the granules or particles. However, the pelletizing and grinding may be carried out to produce particles or granules having some other size range, shape, or to reduce or increase the average surface area of the SAR composite. In one embodiment, the SAR composite may be screened through a mesh or sieve to select for particles having a certain size, without the step of pelletizing and grinding. In another embodiment, the SAR composite may have an average particle size that is larger than desired, and thus may be ground and screened for a particle size range without a step of pelletizing. In another embodiment, particles larger or smaller than a certain particle size range may be repeatedly pelletized and/or ground. The screening or sieving of the particles may include a vibrating screen, a gyrating screen, a trommel screen, or some other mechanical separation device.

In one embodiment, the SAR composite is biodegradable. A biodegradable material is defined as a material that is capable of being broken down into innocuous products by the action of living beings (i.e., microorganisms). A biodegradable material is able to degrade and mineralize as a consequence of microbial enzymatic attack by microorganisms such as bacteria, fungus, algae, and protozoans. Biodegradation may occur anaerobically as well as aerobically. Ionization and/or oxidation may not be required. Preferably the SAR composite, added to a soil, biodegrades in less than 10 years, preferably in less than 5 years or less than 1 year. In this embodiment, a SAR composite may be mixed with a soil without having to be removed.

In one embodiment, the SAR composite may be compostable. A compostable material is a material which undergoes physical, chemical, thermal, and/or biological degradation in a municipal solid waste composting facility such that it enters into and is physically indistinguishable from the finished compost (humus), and which material ultimately mineralizes (biodegrades to carbon dioxide, water, and biomass) in the environment at a rate equivalent to that of known compostable materials in municipal solid waste such as paper and yard waste. Generally, compounds that are biodegradable are also compostable. Where the SAR composite is biodegradable, a soil mixed with the SAR composite may be safely added to a compost stream.

In an alternative embodiment, prior to the pelletizing, grinding, or other shaping steps, a binding agent or binder may be added to the SAR composite. The binder may form an aggregate with the catalyst, enhance the SAR composite's absorption, temperature stability, and/or structural stability, or provide a specified structure for the SAR composite to take a shape. The binder may be a cellulosic polymer, a resin, calcium phosphate, or a combination thereof, and may have weight percent of 1-80 wt %, preferably 5-50 wt %, more preferably 10-30 wt % within the SAR composite. A cellulosic polymer may be used to provide a disordered porous fiber on which the catalyst may be distributed. With certain binders in use, pellets may be formed with less than 50 psi pressure applied, less than 25 psi pressure applied, or with almost no pressure applied.

In one embodiment, a fibrous base material may be added to the SAR composite to enhance stability and/or adsorption. Thus, the SAR composite may further comprise a fibrous base material. The fibrous base material is preferably one or more selected from the group consisting of a cellulosic fiber, an organic synthetic fiber, and a mixture of a cellulosic fiber and an organic synthetic fiber. Examples of the cellulosic fiber include natural fibers such as fluff pulp and cellulosic chemical fibers such as viscose rayon, acetate rayon, and cuprammonium rayon. Such cellulosic natural fibers are not particularly limited with respect to their raw material (needle-leaf trees, broadleaf trees, etc.), production method (chemical pulp, semichemical pulp, mechanical pulp, CTMP, etc.), bleaching method, etc. Examples of the organic synthetic fiber include polypropylene fiber, polyethylene fiber, polyamide fiber, polyacrylonitrile fiber, polyester fiber, polyvinyl alcohol fiber, polyurethane fiber, and heat-weldable composite fiber (e.g., fiber in which at least two of said fibers differing in melting point are hybridized in a sheath-core type, an eccentric type, a parallel type, fiber in which at least two of said fibers are blended, and fiber in which the surface layer of said fibers is modified, etc.). Preferred among these fibrous base materials are cellulosic natural fiber, polypropylene fiber, polyethylene fiber, polyester fiber, heat-weldable composite fiber, and mixed fiber thereof, and fluff pulp, heat-weldable composite fiber, and mixtures thereof are more preferred in that a resulting absorber is excellent in shape retention after water absorption. A fibrous base material may be present at 1-20 wt %, preferably 2-15 wt % relative to a total weight of the SAR composite, though in some embodiments, the fibrous base material may be present at a weight percentage of lower than 1 wt % or greater than 20 wt %.

The fibrous base material is not particularly limited in length and thickness, and usually, it can suitably be used if its length is within a range of 1 to 200 mm and its thickness is within a range of 0.1 to 100 deniers. The shape thereof is not particularly limited if it is fibrous, and examples of the shape include narrow cylindrical form, split yarn form, staple form, filament form, and web form. In one embodiment, a fibrous base material may be used to form a large, flexible sheet or layer of the SAR composite to place on top of or just underneath the soil near a plant. For instance, this sheet may have a length of 10-100 cm, preferably 20-80 cm, and a width of 4-90 cm, preferably 10-75 cm. Such sheet may have a thickness as that described previously for the average longest dimension of particles or granules, or may be 2-10 mm, preferably 3-8 mm.

The SAR may be made using one of three primary methods: gel polymerization, suspension polymerization, or solution polymerization. Each of the processes has their respective advantages, but all may be tailored to yield similar qualities. The SAR composite may be formed by adding pozzolan before, during, and/or after any polymerization step.

Gel polymerization may involve mixing acrylic acid, water, cross-linking agents, and UV initiator chemicals and placing either on a moving belt or in large tubs. The liquid mixture may be transferred into a reactor comprising a shielded chamber with a series of strong UV lights. The UV radiation drives the polymerization and cross-linking reactions. The resulting cross-linked products are sticky gels containing 60-70 wt % water relative to a total mass. The cross-linked products may be dried, shredded, or ground into particles. Additional cross-linking agents may be sprayed on the particles' surface in order to induce "surface cross-linking," which increases the gel's ability to swell under pressure—a property measured as absorbency under load (AUL), or absorbency against pressure (AAP). The dried polymer particles may be screened for proper particle size distribution and packaging. The gel polymerization method may be used for making sodium polyacrylate superabsorbent polymers.

Solution-based polymerization may be used for SAR manufacture of co-polymers, preferably those with the toxic acrylamide monomer. This process is efficient and generally has a lower capital cost base. The solution process uses a water-based monomer solution to produce a mass of reactant polymerized gel. The polymerization's own exothermic reaction energy is used to drive much of the process, helping reduce manufacturing cost. The reactant polymer gel is then chopped, dried, and ground to its final granule size. Any treatments to enhance performance characteristics of the SAR are usually accomplished after the final granule size is created.

Solution polymers offer the absorbency of a granular polymer supplied in solution form. Solutions can be diluted with water prior to application, and can coat most substrates or be used to saturate them. After drying at a specific temperature for a specific time, the result is a coated substrate having superabsorbency. For example, this chemistry can be applied directly onto wires and cables, and it is especially useful for use on components such as rolled goods or sheeted substrates.

The suspension polymerization process involves suspending a water-based reactant in a hydrocarbon-based solvent. The net result is that the suspension polymerization creates the primary polymer particle in the reactor rather than mechanically in post-reaction stages. Performance enhancements can also be made during, or just after, the reaction stage. However, from a manufacturing standpoint, the suspension process requires a higher degree of production control and product engineering during the polymerization step.

In one embodiment, a cross-linking agent may be used to produce the SAR, or may be used on a SAR composite for the purpose of surface cross-linking. In one embodiment, the at least one polymer or copolymer of the SAR composite is cross-linked. In some embodiments, a cross-linking agent may be needed because unless the polymer of the SAR is cross-linked, it may dissolve in aqueous fluid. Cross-linking permits the polymer to absorb aqueous fluid without dissolving. The amount of cross-linking agent added may be indirectly proportional to the absorbency of the resulting SAR and/or SAR composite. Exemplary preferred cross-linking agents include glycerides; diepoxides; diglycidyls; cyclohexadiamide; methylene bis-acrylamide; bishydroxyalkylamides, such as bis hydroxypropyl adipamide; formaldehydes, such as urea-formaldehyde and melamine-formaldehyde resins; isocyanates including di- and tri-isocyanates; epoxy resins, typically in the presence of a base catalyst; derivatives thereof, and mixtures thereof. Other cross-linking agents include, but are not limited to, aliphatic unsaturated amides, such as methylenebisacryl- or -methacrylamide or ethylenebisacrylamide; aliphatic esters of polyols or alkoxylated polyols with ethylenically unsaturated acids, such as di(meth)acrylates or tri(meth)acrylates of butanediol or ethylene glycol, polyglycols or trimethylolpropane; di- and triacrylate esters of trimethylolpropane which may be oxyalkylated, desirably ethoxylated, with about 1 to about 30 moles of alkylene oxide; acrylate and methacrylate esters of glycerol and pentaerythritol and of glycerol and pentaerythritol oxyethylated with desirably about 1 to about 30 mol of ethylene oxide; allyl compounds, such as allyl(meth)acrylate, alkoxylated allyl(meth)acrylate reacted with desirably about 1 to about 30 mol of ethylene oxide, triallyl cyanurate, triallyl isocyanurate, maleic acid diallyl ester, poly-allyl esters, tetraallyloxyethane, triallylamine, tetraallylethylenediamine, diols, polyols, hydroxy allyl or acrylate compounds and allyl esters of phosphoric acid or phosphorous acid; and monomers that are capable of cross-linking, such as N-methylol compounds of unsaturated amides, such as of methacrylamide or acrylamide, and the ethers derived therefrom. Ionic cross-linkers such as multivalent metal salts may also be employed. Mixtures of the cross-linking agents mentioned can also be employed. The content of the internal cross-linking agents is from about 0.001% to about 5% by weight such as from about 0.2% to about 3% by weight based on the total amount of the polymerizable unsaturated acid group containing monomer.

In one embodiment of the method, the at least one polymer or copolymer is cross-linked and has a certain degree of cross-linking, or a certain cross-linking density. Cross-linking may be measured by swelling experiments. Here, a cross-linked sample is placed into an appropriate solvent at a specific temperature, and either the change in mass or the change in volume is measured. In one embodiment, lower swelling correlates with a higher cross-linking density. Based on the degree of swelling, the Flory Interaction Parameter (which relates the solvent interaction with the sample), and the density of the solvent, the theoretical degree of crosslinking can be calculated according to Flory's Network Theory. Two ASTM standards are commonly used to describe the degree of cross-linking in thermoplastics. In ASTM D2765, the sample is weighed, then placed in a solvent for 24 hours, weighed again while swollen, then dried and weighed a final time. The degree of swelling and the soluble portion can be calculated. In another ASTM standard, F2214, the sample is placed in an instrument that measures the height change in the sample, allowing one to measure the volume change. The cross-link density can then be calculated. In one embodiment, the cross-link density may be considered the number of cross-linked points per unit volume, and may be given as units of $mol/cm^3$. With this definition of cross-link density, in one embodiment, the at least one polymer or co-polymer of the SAR composite, in a dried state, has a cross-link density of 100-5,000 $mol/cm^3$, 200-3,000 preferably $mol/cm^3$, more preferably 500-1,000 $mol/cm^3$, even more preferably 600-900 $mol/cm^3$. However, in some embodiments, the cross-link density may be lower than 100 $mol/cm^3$, for instance, 5-50 $mol/cm^3$. In other embodiments, the cross-link density may be greater than 5,000 $mol/cm^3$, for instance, 5,100-5,400 $mol/cm^3$, or greater than 5,400 $mol/cm^3$.

In one embodiment, instead of using a cross-linking agent, self-cross-linking copolymers may also be used. If a self-cross-linking copolymer is used, either a single or multiple self-reactive functional group(s) or multiple co-reactive functional groups are incorporated into the mixture. One exemplary co-reactive functional group is glycidyl methacrylate, and others are possible.

Once a cross-linked polymer is formed, the cross-linked polymer may be neutralized to convert the carboxyl groups to potassium salts, where, for example, potassium hydroxide or potassium methoxide is used to neutralize the polymer. This neutralization does not produce corrosive and dangerous reaction by-products such as ammonia. Exemplary solvents that may be used to effect neutralization include potassium hydroxide, potassium methoxide, and a mixture thereof, any of which may be diluted in methanol. In other embodiments, saponification may be used instead of neutralization In some embodiments, initiators can be used for initiation of the free-radical polymerization. Suitable initiators include, but are not limited to, azo or peroxo compounds, redox systems, or UV initiators, sensitizers, and/or radiation.

In one embodiment, the SAR composite is surface cross-linked. The term "surface cross-linking" means that the level of functional cross-links in the vicinity of the surface of the SAR composite particle generally is higher than the level of functional cross-links in the interior of SAR composite particle. As used herein, "surface" describes the outer-facing boundaries of the particle. For porous superabsorbent polymer particles, exposed internal surface also are included in the definition of surface. In general, surface cross-linking is a process that is believed to increase the cross-link density of the polymer matrix in the vicinity of the surface with respect to the cross-linking density of the SAR composite interior.

In some particular aspects, desirable surface cross-linking agents include chemicals with one or more functional groups that are reactive toward pendant groups of the polymer chains, typically the acid groups. The surface cross-linking agent may be present in an amount of from about 0.001% to about 5% by weight of the dry SAR composite, and such as from about 0.1% to about 3% by weight, and such as from about 0.1% to about 1% by weight, based on the weight of the dry SAR composite. A heat treatment step after addition of the surface cross-linking agent may be desirable.

In one embodiment, the SAR or SAR composite may be contacted with a base to form an expanded cross-linked polymer resin. This contacting with a base may form a polyzwitterion/dianion SAR. The contacting can be performed by immersing and agitating a cross-linked SAR in an alkaline solution comprising the base. The base may be a strong base (i.e. lithium hydroxide, sodium hydroxide, potassium hydroxide, etc.) or a weak base (i.e. potassium carbonate, ammonium hydroxide, sodium carbonate, calcium carbonate, sodium sulfate), preferably a strong base, most preferably sodium hydroxide (NaOH), preferably a 0.5-1.5 M solution of NaOH, preferably a 0.75-1.25 M solution, preferably a 0.9-1.1 M solution, preferably a 0.95-1.05M solution or a 1.0 M solution of NaOH. In a preferred embodiment, the contacting is performed at a temperature of 0-60° C., preferably 15-50° C., preferably 20-40° C., preferably 20-30° C., more preferably 25° C. or room temperature and has a stirred reaction time of 0.5-6 hr, preferably 1-4 hr, preferably 1-3 hr, preferably 1.5-2.5 hr, or about 2 hr. A mass ratio of the SAR to the alkaline solution may be 0.01:1-0.50:1, preferably 0.03:1-0.20:1, more preferably 0.09:1-0.12:1 or about 0.10:1.

In one embodiment, the SAR may be mixed with a series of alkaline solutions to ensure a complete ionic exchange to form an expanded SAR. The expanded SAR may be washed and rinsed with water or a non-aqueous solvent, preferably a polar protic solvent, preferably methanol, and dried under vacuum at 50-100° C., preferably 50-80° C., preferably 60-70° C., or about 65° C., preferably until the expanded SAR reaches a constant weight to form a dried expanded SAR. In a preferred embodiment, this base contacting to produce an expanded SAR, and the subsequent rinsing and drying has a yield of greater than 60%, preferably greater than 70%, preferably greater than 80%, more preferably greater than 85%.

The expanded SAR may be "expanded" in the sense that repulsion among anionic motifs increases its swelling coefficient beyond that of a SAR not treated with a base. The swelling coefficient is the ratio of a wet (hydrated) volume of the SAR to its dry volume. The contacting with a base to form an expanded SAR may increase this swelling coefficient by a factor of 1.5-5.0, preferably 2.0-4.5, more preferably 2.5-4.0, or about 3.5. In one embodiment, a SAR having a greater swelling coefficient may have a greater adsorption capacity for certain solutions. In one embodiment, a SAR having a greater swelling coefficient and/or having contact with a base may have a lower density.

In one embodiment, a SAR composite comprises polyacrylic acid, polyacrylamide, cellulose, and natural pozzolan. Here, the polyacrylic acid may be present at a weight percentage of 10-60 wt %, preferably 15-50 wt %, more preferably 25-40 wt % relative to a total weight of the polyacrylic acid, polyacrylamide, cellulose, and natural pozzolan. The polyacrylamide may be present at a weight percentage of 10-40 wt %, preferably 15-38 wt %, more preferably 20-35 wt % relative to a total weight of the polyacrylic acid, polyacrylamide, cellulose, and natural pozzolan. The cellulose may be present at a weight percentage of 5-40 wt %, preferably 10-35 wt %, more preferably 18-28 wt % relative to a total weight of the polyacrylic acid, polyacrylamide, cellulose, and natural pozzolan. The natural pozzolan may be present at a weight percentage of 10-60 wt %, preferably 20-50 wt %, more preferably 30-48 wt % relative to a total weight of the polyacrylic acid, polyacrylamide, cellulose, and natural pozzolan.

In one embodiment, the SAR composite may comprise one or more polymers, but may not contain cellulose. For instance, in one embodiment, the SAR composite may comprise polyacrylic acid, polyacrylamide, and natural pozzolan, with no cellulose being present. In this embodiment, polyacrylic acid may be present at a weight percentage of 30-40 wt %, preferably 32-38 wt %, more preferably 34-37 wt %, or about 36 wt %, relative to a total weight of the polyacrylic acid, polyacrylamide, and natural pozzolan. The polyacrylamide may be present at a weight percentage of 10-25 wt %, preferably 12-22 wt %, more preferably 16-20 wt %, or about 18 wt % relative to a total weight of the polyacrylic acid, polyacrylamide, and natural pozzolan. The natural pozzolan may be present at a weight percentage of 40-50 wt %, preferably 42-48 wt %, more preferably 44-47 wt %, or about 46 wt %, relative to a total weight of the polyacrylic acid, polyacrylamide, and natural pozzolan. In one embodiment, a dry SAR composite, before being mixed with soil, fertilizer, pesticide, or other application-related compounds, may consist of polyacrylic acid, polyacrylamide, and natural pozzolan.

In one embodiment, the SAR composite may be made by adding monomers such as acrylic acid and acrylamide, to a volume of water with a natural pozzolan. The monomers may be present in the water at a weight percentage of 20-50 wt %, preferably 30-45 wt %, or about 40 wt % relative to a total weight of the water. The natural pozzolan may be present at a weight percentage of 10-40 wt %, preferably 15-30 wt %, more preferably 20-28 wt %, or about 25 wt %, relative to a total weight of the water. The water, monomers, and natural pozzolan may be mixed in the water to produce a mixture, and the mixture pH may be adjusted to 7.0 with addition of concentrated NaOH solution. The mixture may be degassed by bubbling with Ar or $N_2$ gas for 1-30 min, preferably 2-5 min, or about 3 min. A cross-linking agent such as those previously described may be added to the mixture at a weight percentage of 0.5-5 wt %, preferably 1-3 wt %, or about 2 wt % relative to a total weight of the water. In a preferred embodiment, the cross-linking agent may be bis[2-(methacryloyloxy)ethyl]phosphate ($C_{12}H_{19}O_8P$). In another preferred embodiment, the cross-linking agent may be methylenebisacrylamide (MBA). An initiator, such as those previously mentioned, may also be added to the mixture at a weight percentage of 1-5 wt %, preferably 2.0-4.5 wt %, more preferably 3.5-4.0 wt %, relative to a total weight of the water. In a preferred embodiment, the initiator is potassium persulfate ($K_2S_2O_8$, or KPS). The mixture may be heated and stirred at a temperature of 40-65° C., preferably 50-60° C., more preferably 53-57° C. for 1-8 hours, preferably 2-6 hours, more preferably 3-5 hours, during which the acrylic acid and acrylamide polymerize. During this polymerization, the mixture may be kept under an inert atmosphere of Ar or $N_2$. The solid product may be separated by filtration, and then dried in a desiccator or an oven, for instance, at 70-85° C., preferably 72-80° C. The solid product may be milled and sifted to produce the SAR composite having a desired particle size.

In one embodiment, the SAR composite further comprises at least one selected from the group consisting of a plant fertilizer, a mineral, a plant growth hormone, a pesticide, or a fungicide. The SAR composite may comprise the at least one fertilizer, mineral, plant growth hormone, pesticide, or fungicide at a weight percentage of 0.1-20 wt %, preferably 1-15 wt %, more preferably 2-10 wt %. In one embodiment, applying a fertilizer, mineral, plant growth hormone, pesticide, or fungicide using the SAR composite may help protect groundwater from contamination, while delivering those compounds to a plant.

In one embodiment, the fertilizer or mineral may be a nitrogen source, a phosphorus source, a potassium source, calcium, magnesium, sulfur, copper, manganese, iron, zinc, or boron. Commonly used fertilizers and minerals include, but are not limited to, calcium sulfate, urea, calcium nitrate, calcium ammonium nitrate, potassium chloride, potassium nitrate, magnesium ammonium phosphate (referred to as struvite), iron phosphate, ammonium phosphate and ammonium sulfate nitrate. Additional exemplary embodiments of minerals include other urea compounds, anhydrous ammonia, nitrate salts, phosphate salts, ammonium salts and mixtures thereof. The cationic component of the nitrate salts that fall within the scope of the present invention may comprise of sodium, potassium, or calcium for which the corresponding salt has a chemical formula of $Ca(NO_3)_2$.

Urea compounds that fall within the scope of the present invention include urea having a chemical formula of $CO(NH_2)_2$, urea sulfate $CH_4N_2O.H_2SO_4$, urea ammonium nitrate having a chemical formula of $NH_4NO^{3+}CO(NH_2)_2+H_2O$, urea ammonium phosphate $CO(NH_2)-NH_3-H_3PO_4-H_2O$, and urea phosphate $CO(NH_2)_2H_3PO_4$.

Phosphate salts that fall within the scope of the present invention include ammonium chloride, ammonium nitrate, ammonium sulfate, mono-ammonium phosphate, diammonium phosphate, ammonium phosphate-sulfate, ammonium polyphosphate.

The ammonium salt mineral source nutrients that fall within the context of the present invention include ammonium chloride $NH_4Cl$, ammonium nitrate $NH_4NO_3$, ammonium sulfate $(NH_4)_2SO_4$, mono-ammonium phosphate $NH_4H_2PO_4$, ammonium thiosulfate $H_8N_2O_3S_2$, diammonium phosphate $(NH_4)_2HPO_4$, ammonium phosphate-sulfate $(NH_4)_2(H_2PO_4)(HSO_4)$ and ammonium polyphosphate $(NH_4PO_3)_n$.

Generally, the cationic component of the mineral source nutrients may include ammonium, calcium, urea, sodium, ferrous cation, ferric cation, manganese, copper, zinc and molybdenum. The complementary anionic components of the mineral source nutrients may include phosphate, sulfate, chloride, thiosulfate, carbonate, hydroxide, acetate, chelate, oxide, nitrate and sulfide. Additional mineral source nutrients that fall within the scope of the present invention include urea, ammonia, sulfur, citric acid, boric acid, oxalic acid, acetic acid, phosphoric acid and mixtures thereof.

In one embodiment, a fertilizer may comprise a carbohydrate source nutrient, which preferably comprises oligosaccharides. Examples of oligosaccharides that fall within the scope of the present invention include, but are not limited to, disaccharides, such as sucrose and lactose, trisaccharide raffinose and tetrasaccharide stachyose. The chemical formula of unmodified disaccharides is $C_{12}H_{22}O_{11}$.

Various fertilizers that are commercially available may also be used. Exemplary soil-based nutrients that may also optionally be added during or after production of the NC-SAP product include plant micro nutrient such as calcium, magnesium, potassium, phosphorus, boron, zinc, manganese, copper, iron, sulfur, nitrogen, molybdenum, silicon, ammonium phosphate, fish meal, organic compounds and additives, organic based fertilizers derived from plant and animal products and derivatives, blends, and mixtures thereof. More information about exemplary growth-promoting additives can be found in The Farm Chemicals Handbook published by Meister Publishing Company and incorporated herein by reference in its entirety.

Exemplary pesticides include acaricides, algicides, antifeedants, avicides, bactericides, bird repellents, chemosterilants, fungicides, herbicide safeners, herbicides, insect attractants, insect repellents, insecticides, mammal repellents, mating disruptors, molluscicides, nematicides, plant activators, plant-growth regulators, rodenticides, synergists, virucides, derivatives thereof, blends thereof, and combinations thereof. Three exemplary commercially available pesticides are as follows: Asset™, manufactured by Helena Chemicals of Fairfax, S.C.; ACA™, manufactured by UAP of Greeley, Colo.; and Miracle-Gro™, manufactured by the Scotts Company of Marysville, Ohio.

Exemplary plant growth hormones include antiauxins, such as, for example, 2,3,5-tri-iodobenzoic acid; auxins, such as, for example, 2,4-D; cytokinins, such as, for example, kinetin; defoliants, such as, for example, metoxuron; ethylene inhibitors; ethylene releasers, such as, for example, ACC and gloxime; gibberellins; growth inhibitors; growth retardants; growth stimulants; derivatives thereof and mixtures thereof.

In an alternative embodiment, the SAR composite may further comprise an herbicide. Exemplary herbicides include: amide herbicides including chloroacetanilide herbicides (such as alachlor and metolachlor); antibiotic herbicides; aromatic acid herbicides including benzoic acid herbicides (such as chloramben and dicamba), phthalic acid herbicides, picolinic acid herbicides, and quinolinecarboxylic acid herbicides; arsenical herbicides; benzoylcyclohexanedione herbicides; benzofuranyl alkylsulfonate herbicides; carbamate herbicides; carbanilate herbicides; cyclohexene oxime herbicides; cyclopropylisoxazole herbicides; dicarboximide herbicides; dinitroaniline herbicides (such as trifluralin and pendimethalin); dinitrophenol herbicides; diphenyl ether herbicides; dithiocarbamate herbicides; halogenated aliphatic herbicides; imidazolinone herbicides; inorganic herbicides; nitrile herbicides; organophosphorus herbicides; phenoxy herbicides (such as 2-4D (also called 2,4-dichlorophenoxy acetic acid) and Mecoprop); phenylenediamine herbicides; pyrazolyloxyacetophenone herbicides; pyrazolylphenyl herbicides; pyridazine herbicides; pyridazinone herbicides (such as Norflurazon™); pyridine herbicides; pyrimidinediamine herbicides; quaternary ammonium herbicides; thiocarbamate herbicides (including butylate and EPTC); thiocarbonate herbicides; thiourea herbicides; triazine herbicides (such as atrazine and simazine); triazinone herbicides (such as Metribuzin™); triazole herbicides; triazolone herbicides; triazolopyrimidine herbicides; uracil herbicides; urea herbicides; Roundup™ (manufactured by Monsanto Co. of St. Louis, Mo.); Chloropropham™; Surflan™ (manufactured by Southern Agricultural Insecticides, Inc. of Palmetto, Fla.); and Clomazone™. A combination or blend of these herbicides may be used.

In one embodiment, the SAR composite further comprises a pesticide or a fungicide. Exemplary pesticides include *Bacillus thuringiensis*, mycorrhizal fungi, thiodan, diazinon, and malathion. Exemplary fungicides include Aliette™ (active ingredient, aluminum tris (o-ethylphosphenate)) manufactured by Bayer Crop Science of Research Triangle Park, N.C.; Rovral™ (active ingredient, iprodione) manufactured by Bayer Crop Science of Research Triangle Park, N.C.; Mancozeb™; Sovran™ (active ingredient, kresoximmethyl) manufactured by BASF Agolutions of Canada; Flint™ (active ingredient, trifloxystrobin) manufactured by Novartis Corporation; Ridomil™ (active ingredient, Mefenoxam) and Ridomil Gold™ (active ingredient methoxyacetylamino-R-2-2[2,6-dimethylphenyl-propionic acid methyl ester]manufactured by Syngenta Crop Protection Inc. of Greensboro, N.C.; Dividend™ (active ingredient, difenoconazole) manufactured by Syngenta Crop Protection Inc. of Greensboro, N.C.; SoilGard™ (active ingredient, *gliocladium virens*) manufactured by Certis USA of Columbia, Md.; Bravo™ (active ingredient, chlorothalonil) manufactured by Syngenta Crop Protection Inc. of Greensboro, N.C.; Vitavax™ (active ingredient, carboxin) manufactured by Gustafson LLC of Canada; Thiram™ (active ingredient, tetramethylthiuram disulfide) manufactured by Gustafson LLC of Canada; Maxim™ (active ingredient, fludioxonil) manufactured by Syngenta Crop Protection Inc. of Greensboro, N.C.; Quadris™ (active ingredient, azoxystrobin) manufactured by Syngenta Crop Protection Inc. of Greensboro, N.C.; and Elite™ (active ingredient, tebuconazole) manufactured by Bayer Crop Science of Research Triangle Park, N.C. A combination or blend of these may be used.

In one embodiment, the soil of the method comprises at least one of a plant, seedling, root, and seed. Preferably the soil comprises a plant. However, in other embodiments, the soil may comprise a fungus (for instance, mushrooms), insects, worms, or other organisms.

In one embodiment, soil comprises a plant, and the plant is a turf grass or a food crop. A turf grass may be centipedegrass, St. Augustine grass, bluegrass, Bermuda grass, fescue grass, or some other type of grass. Exemplary food crops and other crops include, but are not limited to, alfalfa, asparagus, barley, beans (including lima beans, snap beans, and green beans), broccoli, canola, carrots, cauliflower, celery, coriander, coreopsis, cotton, cucumbers, dates, dill, *elymus glaucus*, figs, field corn (including sweet corn), fine fescue, garlic, kentucky bluegrass, lentils, lettuce (including mesclin, head lettuce, leaf lettuce, romaine lettuce, and cabbage), oats, onions, melons (including watermelon, cantaloupe, and honeydew), mushrooms, parsley, peas (dry), peppers (including bell peppers), potatoes, pumpkins, radishes, rye grass, sod, sorghum, soybeans, spinach, squash, sugar beets, sunflowers, Swiss chard, tall fescue, tobacco, tomatoes, turnips, wheat, white clover, wild rye, and *zinnia*.

In one embodiment, the method involves mixing a SAR composite with the soil. This may also include contacting a plant with the SAR composite and then planting the plant in soil, as the SAR composite may come loose on its own and mix with the soil. Application of the SAR composite to a plant, root, seed, or seedling may occur by any method known to one of ordinary skill, including, but not limited to, dipping the plant, root, seed, or seedling into SAR composite particles, a slurry of SAR composite particles, or a paste including the SAR composite; mixing dirt, soil, fertilizer, or another growing substrate with the SAR composite particles and later planting a plant, root, seed, or seedling into the growing substrate/SAR composite mixture; and forming a slurry of SAR composite that is applied directly to the growing substrate. The soil may be a soil similar to alfisol soil, andisol soil, aridisol soil, entisol soil, gelisol soil, histosol soil, inceptisol soil, mollisol soil, oxisol soil, spodosol soil, ultisol soil, vertisol soil, acrisol soil, albeluvisol soil, alisol soil, andosol soil, anthrosol soil, arenosol soil, calcisol soil, cambisol soil, chernozem soil, cryosol soil, durisol soil, ferralsol soil, fluvisol soil, gleysol soil, gypsisol soil, histosol soil, kastanozem soil, leptosol soil, lixisol soil, luvisol soil, nitisol soil, phaeozem soil, planosol soil, plinthosol soil, podzol soil, regosol soil, solonchak soil, solonetz soil, stagnosol soil, technosol soil, umbrisol soil, vertisol soil, sand, dune sand, commercial potting soil, clay, or some other type of soil, or some mixture of the above. In alternative embodiments, some other organic material may be used as a soil, such as compost, mulch, or sawdust.

In one embodiment, the SAR composite is present at a weight percentage of 0.1-5.0 wt %, preferably 0.2-1.0 wt %, more preferably 0.4-0.7 wt % relative to a weight of the soil. However, in other embodiments, the SAR composite may be present at a weight percentage of less than 0.1 wt % or greater than 5.0 wt %. In this embodiment, the SAR composite may or may not comprise water.

Preferred exemplary methods of using the SAR composite include (1) placing the SAR composite directly onto a growing substrate in proximity to a plant, seed, seedling, or root and (2) applying to a plant, seed, seedling, or root the SAR composite (or a slurry or fertilizer including the SAR composite) and then planting the plant, root, seed, or seedling in the growing substrate. One exemplary method of preparing a slurry for use as a root dip involves combining between about 3 oz. and about 6 oz. of SAR composite with about 5 gallons of water to form a slurry that is applied to the growing substrate and/or to the plant, root, seed, or seedling. One exemplary method of preparing a seed coating including the SAR composite involves combining a binding agent and the SAR composite with a solvent, preferably water, to form a slurry that is applied to the seed. Alternatively, the dry SAR composite may be combined with a binder or tackifier, such as, for example, a mineral, gypsum, or clay, to form a mixture that may stick to the seed. These methods can also be used to prepare a coating to be applied to any of a plant, root, seed, or seedling.

In one embodiment, the SAR composite further comprises water at a weight percentage of 20-80 wt %, preferably 30-75 wt %, more preferably 35-70 wt %, relative to a total weight of the SAR composite dry weight plus the weight of the water. In one embodiment, the SAR composite further comprises water at a weight percentage of 50-95 wt %, preferably 60-90 wt %, more preferably 65-85 wt % relative to a total weight of the SAR composite dry weight plus the weight of the water. In some embodiments, this weight percentage may be less than 20 wt %, for instance, 5-10 wt %, or 10-20 wt %, or less than 5 wt %. In other embodiments, the weight percentage of water may be greater than 95 wt %. In one embodiment, the SAR composite may be able to hold up to 10-500, preferably 20-100, more preferably 30-80 times its weight in water. However, in some embodiments, the at least one polymer or co-polymer may only be able to hold less than 10 times its weight in water, or greater than 500 times its weight in water. In another embodiment, the SAR composite may be able to hold up to 1-10 times its weight in water, up to 3-9 times it weight in water, 4-8 times its weight in water, or about 8 times its weight in water. In one embodiment, a SAR composite holding 100% of its maximum absorption capacity may be mixed with soil. In other embodiments, the SAR composite may hold less than 100% of its maximum absorption capacity when mixed, for instance, the SAR composite may hold 50-90%, or 20-60% of its maximum absorption capacity. Preferably, the pozzolan is able to aid in absorption, in addition to the SAR. As defined here, the maximum absorption capacity is the maximum amount of water or aqueous solution that an SAR composite is able to hold when it is not actively being submerged, soaked, or wetted with water or aqueous solution. The maximum absorption capacity may be thought of as the amount of water or aqueous solution absorbed by the SAR composite in a saturated state. This value may be dependent on aqueous solution components, temperature, and SAR composite structure and chemical composition.

In one embodiment, the SAR composite may reach its maximum absorption capacity after being submerged in fresh water or saline water (or some other aqueous solution) for 3-24 h, preferably 6-18 h, more preferably 8-12 h, and at a temperature of 4-40° C., preferably 18-30° C., more preferably 22-27° C. or about room temperature. In one embodiment, the water absorbance may be measured by dividing the mass of the water or saline absorbed by the mass of the dry SAR composite. This water absorbance value may be thought of as Q, where $Q=(w_2-w_1)/w_1$, with $w_1$ being the mass of the SAR composite before absorbing water or saline, and with $w_2$ being the mass of the SAR composite after the absorbing. In one embodiment, the SAR composite may have a water absorbance value, Q, of 1-100 g water per g SAR composite, preferably 10-90 g/g, more preferably 40-88 g/g, even more preferably 55-85 g/g, or about 83.75 g/g after being submerged for 8-12 hours in water at room temperature. However, in some embodiments, the water absorbance may be less than 1 g/g or greater than 100 g/g.

Preferably, a SAR composite holding less than its maximum absorption capacity of water (for instance, by releasing water to a plant or from evaporation loss), may be able to absorb more water (for instance, from rain or irrigation) and have an increased weight percentage of water. Preferably the SAR composite does not inadvertently dry the soil and harm the plant.

In one embodiment, a SAR composite comprising water at 80-100% of its maximum absorption capacity may release water at an average rate of 5-90 mL water per kg SAR composite per day ($mL \cdot kg^{-1} \cdot d^{-1}$), preferably 10-80 $mL \cdot kg^{-1} \cdot d^{-1}$, more preferably 20-75 $mL \cdot kg^{-1} \cdot d^{-1}$, even more preferably 30-70 $mL \cdot kg^{-1} \cdot d^{-1}$. However, in some embodiments, the SAR composite may release water at an average rate of less than 5 $mL \cdot kg^{-1} \cdot d^{-1}$, or greater than 90 $mL \cdot kg^{-1} \cdot d^{-1}$, for instance, 100-120 $mL \cdot kg^{-1} \cdot d^{-1}$, preferably 120-140 $mL \cdot kg^{-1} \cdot d^{-1}$, 140-200 $mL \cdot kg^{-1} \cdot d^{-1}$, 200-400 $mL \cdot kg^{-1} \cdot d^{-1}$, or more than 400 $mL \cdot kg^{-1} \cdot d^{-1}$. This average rate may be over 1-4 weeks, preferably 1.5-3 weeks, though may also be an average over a time period less than 1 week, or greater than 4 weeks.

In a related embodiment, a SAR composite comprising water mixed with at least one plant fertilizer, mineral, plant growth hormone, pesticide, or fungicide is able to release the water and the plant fertilizer, mineral, plant growth hormone, pesticide, or fungicide at an average rate similar to those discussed above, or a faster or slower rate.

In one embodiment, the SAR composite is able to release water at a faster rate in a drought stress condition than an essentially similar SAR composite in an essentially similar environment that is not in a drought stress condition. For instance, the SAR composite may release water at a rate faster by a factor of 1.2-10, preferably by a factor of 1.5-8, more preferably by a factor of 2-5 when at a temperature of 32-45° C., preferably 37-45° C., than an essentially similar SAR composite at a temperature of 10-25° C., where the rate may be considered as previously described (volume of water per mass SAR composite per length of time). In other embodiments, the SAR composite may release water at a rate faster by a factor of 1.2-10, preferably by a factor of 1.5-8, more preferably by a factor of 2-5 at dry conditions, for instance, in a relative humidity of 0-35%, preferably 3-20%, more preferably 4-15% as compared to an essentially similar SAR composite at a greater relative humidity, for instance, 55-80%, preferably 58-75%. In one embodiment, both lower humidity and higher temperatures may lead to higher average rates of water release from the SAR composite into the soil. In this embodiment, the SAR composite may mitigate the conditions of drought on plants in the soil. As defined here, a rate b being faster by a factor of x compared to rate a means that b=a*x and x>1.

In one embodiment, a growth of the at least one plant, seedling, root, or seed in the soil is improved compared to an essentially identical plant seedling, root, or seed in a second soil that was not mixed with the SAR composite. In one embodiment, the growth may be measured by comparing the change in mass between two plants. For example, two plants starting with similar masses (for instance, within 1% of each other) may be weighed after a period of 1-3 months, or about 2 months. The plant grown with the SAR composite in the soil may have a mass that is 1.1-5 times greater, preferably 1.3-3 times greater, or 1.4-2 times greater than the plant grown in soil without the SAR composite. In some embodiments, other parameters may be used to compare growth between two plants, such as stem thickness, root thickness, length, amount of chlorophyll, wet mass, or response to stress. Other parameters relating to plant growth and plant health may be used for absolute or relative comparisons.

It is recognized that entrapment efficiency, swellability, release rate, and efficacy of the SAR composite can be affected to various degrees by the types of materials used, the processing conditions implemented, and the degree and type of ex-situ downstream processing. Because composition and processing conditions are selected to maximize product performance and processing efficiency, preferred processing parameters, such as, for example, temperature, solids concentration, concentration of SAR or pozzolan, concentration of growth-promoting additive, type of additive, number of additives, levels of addition, addition processes, and addition timing, vary greatly. For this reason, any examples or embodiments listed herein are intended only to further illustrate the invention and are not intended to limit the scope of the invention.

In an alternative embodiment, a cement material may be used in forming the SAR composite, and may be used in place of or in addition to the natural pozzolan, at a weight percentage similar to that previously described. For example, the cement material may be Type I, Type IA, Type II, Type IIA, Type III, Type IIIA, Type IV, or Type V Portland cements (using either the ASTM CI50 standard or the European EN-197 standard), hydraulic cements, non-hydraulic cements, Portland fly ash cement, Portland pozzolan cement, Portland silica fume cement, masonry cements, mortars, EMC cements, stuccos, plastic cements, expansive cements, white blended cements, Pozzolan-lime cements, slag-lime cements, supersulfated cements, calcium aluminate cements, calcium sulfoaluminate cements, geopolymer cements, Rosendale cements, polymer cement mortar, lime mortar, and/or Pozzolana mortar.

In one embodiment, the SAR composite may comprise other inorganic powders. Preferably the inorganic powder included in the embodiments herein has an appropriate hydrophilic property and it is insoluble or hardly soluble in water. Specific examples of the inorganic powder included are metal oxides, such as silicon dioxide and titanium oxides; silicic acids (salts), natural zeolite and synthetic zeolite, kaolin, talc, clays, and bentonite.

In one embodiment, the SAR composite may comprise a zeolite at a weight percentage of 0.1-20 wt %, preferably 1-15 wt %, more preferably 2-10 wt %. Zeolites are porous aluminosilicate minerals that may be found in nature or synthesized. Elementary building units of zeolites are $SiO_4$ and $AlO_4$ tetrahedra. Adjacent tetrahedra are linked at their corners via a common oxygen atom, which results in an inorganic macromolecule with a three-dimensional framework. The three-dimensional framework of a zeolite also comprises channels, channel intersections, and/or cages having dimensions in the range of 0.1-10 nm, preferably 0.2-5 nm, more preferably 0.2-2 nm.

In one embodiment, the zeolite may have a zeolite framework of, or similar to, amicite, ammonioleucite, analcime, barrerite, brewsterite, bellbergite, bikitaite, boggsite, chabazite, chiavennite, clinoptilolite, cowlesite, dachiardite, edingtonite, epistilbite, erionite, faujasite, ferrierite, garronite, gaultite, gismondine, gmelinite, gobbinsite, gonnardite, goosecreekite, gottardiite, harmotome, heulandite, hsianghualite, kalborsite, laumontite, leucite, lévyne, lovdarite, marciopaite, mazzite, merlinoite, mesolite, montesommaite, mordenite, mutinaite, nabesite, natrolite, offretite, pahasapaite, paranatrolite, parthéite, paulingite, perlialite, phillipsite, pollucite, roggianite, scolecite, stellerite, stilbite, terranovaite, tetranatrolite, thomsonite, tschernichite, tschörtnerite, tvedalite, wairakite, weinebeneite, willhendersonite, yugawaralite, and combinations thereof. In another embodiment, the zeolite may have a zeolite framework similar to a synthetic crystalline aluminosilicate, such as zeolites having the trademarked names of ZEOLITE A, ZEOLITE X, ZEOLITE Y, ZEOLITE K-G, ZEOLITE ZK5, ZEOLITE BETA, ZEOLITE ZK-4, SAPO, ALPO, USY, ZEOLITE ZSM-5 ("ZEOLITES SOCONY MOBIL-5" also called more simply, ZSM-5), ZSM-11, ZSM-12, ZSM-20, ZSM-23, ZSM-35, ZSM-38, ZSM-50, and combinations thereof. In an alternative embodiment, some other compositionally related material that is not a zeolite may be used in place of the zeolite nanoparticles, such as amorphous silica-alumina. In one embodiment, the pozzolan of the SAR composite may be considered a zeolite.

In one embodiment, the SAR composite may further comprise a layered double hydroxide at a weight percentage of 0.1-20 wt %, preferably 1-15 wt %, more preferably 2-10 wt %. Layered double hydroxides (LDH) are a class of ionic solids characterized by a layered structure with the generic layer sequence $[AcBZAcB]_n$, where c represents layers of metal cations, A and B are layers of hydroxide ($HO^-$) anions, and Z are layers of other anions and neutral molecules (such as water). Lateral offsets between the layers may result in longer repeating periods. LDHs can be seen as derived from hydroxides of divalent cations with the brucite layer structure $[AdBAdB]_n$, by oxidation or cation replacement in the metal layers (d), so as to give them an excess positive electric charge; and intercalation of extra anion layers (Z) between the hydroxide layers (A,B) to neutralize that charge, resulting in the structure $[AcBZAcB]_n$. LDHs may be formed with a wide variety of anions in the intercalated layers (Z), such as $Cl^-$, $Br^-$, $NO_3^-$, $CO_3^{2-}$, $SO_4^{2-}$ and $SeO_4^{2-}$.

In some LDHs, the positive layer (c) consists of divalent and trivalent cations, and may be represented by the formula $[M^{2+}_{1-x}N^{3+}_x(HO^-)_2]^{x+}[(X^{n-})_{x/n} \cdot yH_2O]^{x-}$, where $X^{n-}$ is the intercalating anion (or anions). Most commonly, $M^{2+}=Ca^{2+}$, $Mg^{2+}$, $Mn^{2+}$, $Fe^{2+}$, $Co^{2+}$, $Ni^{2+}Cu^{2+}$, and $Zn^{2+}$. Fixed-composition phases have been shown to exist over the range $0.2 \leq x \leq 0.33$. However, phases with variable x are also known, and in some cases, x>0.5. Another class of LDH is known where the main metal layer (c) consists of $Li^+$ and $Al^{3+}$ cations, with the general formula $[Li^+Al^{3+}_2(HO^-)_6]^+$ $[Li^+Al^{3+}_2(X^{6-}) \cdot yH_2O]^-$, where $X^{6-}$ represents one or more anions with total charge −6. The value of y is usually between 0.5 and 4.

An LDH may be synthetic or a naturally-occurring layered double hydroxide. Naturally-occurring layered double hydroxides include those in the Hydrotalcite Group (hydrotalcite, pyroaurite, stichtite, meixnerite, iowaite, droninoite, woodallite, desautelsite, takovite, reevesite, or jamborite), the Quintinite Group (quintinite, charmarite, caresite, zaccagnaite, chlormagaluminite, or comblainite), the Fougérite group (fougérite, trébeurdenite, or mössbauerite), the Woodwardite Group (woodwardite, zincowoodwardite, or honessite), the Glaucocerinite Group (glaucocerinite, hydrowoodwardite, carrboydite, hydrohonessite, mountkeithite, or zincaluminite), the Wermlandite Group (wermlandite, shigaite, nikischerite, motukoreaite, natroglaucocerinite, or karchevskyite), the Cualstibite Group (cualstibite, zincalstibite, or omsite), the Hydrocalumite Group (hydrocalumite or kuzelite), or may be an unclassified layered double hydroxide, such as coalingite, brugnatellite, or muskoxite.

In one embodiment, the SAR composite may further comprise a metal organic framework at a weight percentage of 0.1-20 wt %, preferably 1-15 wt %, more preferably 2-10 wt %. As used herein, a metal organic framework (MOF) refers to compounds consisting of metal ions or clusters coordinated to organic ligands to form one, two, or three dimensional structures. They are a subclass of coordination polymers and are often porous. The organic ligands included are sometimes referred to as "struts", one preferable example being trimesic acid or benzene-1,3,5-tricarboxylic acid ($C_9H_6O_6$). More formally, a metal organic framework is a coordination network with organic ligands containing potential voids. As used herein, a coordination network is a coordination compound extending, through repeating coordination entities, in one dimension, but with cross-links between two or more individual chains, loops, or spirolinks, or a coordination compound extending through repeating coordination entities in two or three dimension; and finally a coordination polymer is a coordination compound with repeating coordination entities extending in one, two or three dimensions. In most cases, the pores are stable during elimination of the guest molecules (often solvents) and metal organic frameworks find use for the storage of gases such as hydrogen and carbon dioxide, gas purification, gas separation, catalysis, sensors, and supercapacitors.

Generally, metal organic frameworks (MOFs) are composed of two major components, (i) a metal ion or cluster of metal ions and (ii) an organic molecule called a linker. These materials may often be referred to as hybrid organic-inorganic materials. The organic units are typically mono-, di-, tri-, or tetravalent ligands. The choice of metal and linker dictates the structure and hence properties of the MOF. For example, the metal's coordination preference influences the size and shape of pores by dictating how many ligands can bind to the metal and in which orientation.

In an alternative embodiment, the SAR composite may be used for other purposes, such as water purification, including the absorption of heavy metal contaminants.

The examples below are intended to further illustrate examples of inventive embodiments, and are not intended to limit the scope of the claims.

Example 1

Approach

The water holding capacity of desert soil is a very important agricultural feature. The desert weak soil properties may lead to non-sustainable agricultural and environmental concerns including; excess water, nutrients, and pesticides, that move down the soil profile after the soil gets saturated with irrigation water. In this project, the main objective is to improve the soil properties to hold the water, nutrients, and pesticides in the soil structure of desert, arid, and semi-arid desert areas for a longer period by applying novel techniques to develop different soil additives.

In Saudi Arabia, the plants, trees, agricultural activities, and the biome in this arid and desert region need a lot of soft/non-saline water which is produced by the high-cost desalination processes or drawn from non-renewable fossil water. In this context, a series of grafted biopolymer super absorbing resin (SAR) composites based on Biopolymers methylcellulose (MC), chitosan (Ch), cellulose (Cel), and sodium alginate (NAlg), including natural pozzolans as a geopolymer from Harrat AlMadinah may be produced.

The water holding capacities of these composite resins may be controlled by cross-link density as well as contents of functional minerals. The structure and morphologies of the SAR composites may be characterized by Fourier transform infrared spectroscopy (FT-IR), thermogravimetric analysis (TGA), differential scanning calorimeter (DSC), scanning electron microscope (SEM), and transmission electron microscope (TEM).

SAR composites may also be tested for their possible contribution to plant growth and development. For this purpose, turf grass seeds may be obtained from international seed banks with certificate (such as INRA, France or Japan). The seeds may be planted in plastic pots with soil including different concentrations of SAR composite. Finally, growth rate and physiological status of plants may be analyzed to show the effects of different SAR composites on plant growth and development The experimental part consists of two main phases which are described below in detail:

Example 2

Phase I

1) Carboxy methyl cellulose copolymers with acrylic acid (AA) and acrylamide (AM) are produced via free-radical polymerization of the corresponding monomers. Then, functional mineral volcanic pozzolan already available in Saudi Arabia is added with at least three different fractions in the existence of cross-linker BG. The structure and morphologies of the super-absorbents are characterized by Fourier transform infrared spectroscopy (FTIR), thermogravimetric analysis (TGA), and scanning electron microscope (SEM). The swelling behaviors of the SARs are investigated at various functional mineral contents.

2) Chitosan-Alginic Acid/AMPS polymers are produced via radical polymerization in the presence of cross-linker and functional minerals. The functional minerals as well as cross-linker contents of the SARs may be changed. After obtaining a composition, the composite polymer structures are characterized by FT-IR, TGA, and XRD. The swelling behaviors of the SARs are investigated at various functional mineral contents.

3) Cellulose-functional mineral based composite SAR are produced by graft copolymerization AA and AM using a water-soluble initiator potassium persulfate ($K_2S_2O_8$, or KPS). Cross-linker MBA (methylenebisacrylamide) is used as cross-linking agent. The compound bis[2-(methacryloyloxy)ethyl]phosphate ($C_{12}H_{19}O_8P$) may also be used as cross-linking agent. During production, functional minerals may be added at various compositions. Super absorption characters are studied by changing the functional minerals as well as cross-linker contents.

The structure and morphologies of the super-absorbents are characterized by Fourier transform infrared spectroscopy (FTIR), thermogravimetric analysis (TGA) and scanning electron microscope (SEM). The swelling behaviors of the SARs are investigated at various BG and functional minerals contents 4) Chitosan—functional mineral composite SAR polymer is prepared by free radical polymerization of AA via KPS in the presence of cross-linker. The influences of cross-linker as well as functional mineral contents are further studied. After getting the composition product, the composite polymer structures are characterized by FT-IR, TGA, and XRD. The swelling behaviors of the SARs are investigated at various functional mineral contents.

5) Multifunctional SAR with biodegradable and slow release fertilizer properties, a new -g-sodium alginate (NaAlg)-AA/functional mineral (FM) (NaAlg-g-PAA/FM) superabsorbent is produced by graft cross-link copolymerization of NaAlg and AA in the existence of functional mineral (where PAA is polyacrylic acid). The swelling behaviors of the superabsorbent are investigated. The structure may be proved with a calculated or expected polymerization structure and good thermos stability via IR spectrum and TGA analysis. The morphological features may be confirmed via SEM images.

6) Functional mineral mixtures of sand/soil are prepared at several percentages and swelling characteristics are investigated. In addition to natural volcanic pozzolan, alternative minerals produced in Saudi Arabia region are also used in above experiments 1-5.

7) The environmental compatibility of the SARs is analyzed by inductively coupled plasma-MS spectrometry (ICP-MS), and gas chromatography coupled with MS spectrometry (GC-MS).

Example 3

Phase II

This phase comprises eight main tasks where turf grass is tested on varying ratios of produced SAR composites and soil under a lab-scale simulated local arid environment. The parameters affecting the growth rate and physiological status of the turf grass may include plant stress level, evapotranspiration, soil water content, plant root and leaf growth, water absorbency, and chlorophyll content, and these parameters may be analyzed to determine their dependency on different conditions. For this purpose, the following tests and methods are applied to each experimental group:

1) Superabsorbent polymers (SARs) are tested for their possible contribution to plant growth and development. For this purpose, turf grass seeds are obtained from international seed banks with certificate (such as INRA, France or Japan). They are planted in plastic pots in soil including different concentrations of SARs. Turf grass is a common plant cultivated at many areas for different purposes, such as lawns in the cities, gardens, stadiums, playgrounds, and even in golf courses. Also, it is commonly used by municipalities in Saudi Arabia to make cities green. Thus, turf grass plant may be used to test its water use efficiency after SAR treatments.

2) In total: 5 SARs'1 species (20 seeds)×5 concentrations×3 replicates=75 samples are tested. Five different SAR concentrations may be adjusted as Control (0), 1, 2, 4, 8 g kg$^{-1}$ (chemical/soil) or (0.1; 0.2; 0.4; 0.8%). The given concentrations of each SAR are mixed with soil and added to plastic containers in diameter of 14 cm, height 15 cm with three experimental replicates. The soil mixtures are fully washed with tap water and 20 turf grass seeds are sown into each pot. The pots may be placed in a growth chamber adjusted to 16:8 (light:dark) photoperiod, 25-35° C. temperature regime, and 50-70% humidity conditions. The pots are irrigated in case the soil water content dries to a critical level that threatens the plant health.

3) MDA (Malondialdehyde) analyses are used to show the plant stress level and lipid peroxidation of membranes. The assay is carried out according the method stated by Wang et al. (2013). See Wang, Y.-S., Ding, M.-Di, Gu, X.-G., Wang, J.-L., Pang, Y., Gao, L.-P., Xia, T. (2013), "Analysis of interfering substances in the measurement of malondialdehyde content in plant leaves," *Am. J. Biochem. Biotechnol,* 9, 235-242—incorporated herein by reference in its entirety. Accordingly, 0.5 g of plant tissue is harvested and homogenized with 5% trichloroacetic acid (TCA) mixture. Then the homogenate is centrifuged at 5000×g for 15 min. The supernatant is collected and MDA levels are estimated according to TBA method (Hodges et al. 1999). See Hodges, D. M., DeLong, J. M., Forney, C. F., & Prange, R. K. (1999), "Improving the thiobarbituric acid-reactive-substances assay for estimating lipid peroxidation in plant tissues containing anthocyanin and other interfering compounds," *Planta,* 207(4), 604-611—incorporated herein by reference in its entirety. 2 mL of extraction solution and 3 mL of 0.5% TBA including 5% TCA are mixed and may be incubated at 95° C. for 30 min followed by centrifugation at 5000×g for 15 min. The supernatant is collected and MDA content is measured at different wavelengths, 450, 532, and 600 nm, and used in the below equation (Wang et al. 2013). See Wang, Y.-S., Ding, M.-Di, Gu, X.-G., Wang, J.-L., Pang, Y., Gao, L.-P., Xia, T. (2013). "Analysis of interfering substances in the measurement of malondialdehyde content in plant leaves," *Am. J. Biochem. Biotechnol,* 9, 235-242—incorporated herein by reference in its entirety.

$$C_{MDA} (\mu mol\ mL^{-1})=6.45\times(D_{532}-D^{600})-0.56\times D_{450}$$

4) Evapotranspiration (ET): ET shows the total water loss from the soil by plants during their transpiration from leaves. For this purpose, a Lysimeter (Lysimeter SW-074, SMS, US) may be used. The instrument may penetrate soil up to 10 cm in depth. Porous stainless-steel suction character of this instrument permits collection of pore water from unsaturated soils. Vacuum is applied to the lysimeter through tubing leading from the lysimeter to the ground surface. Firstly, a negative air pressure is applied to draw pore water into the lysimeter and then the pore water is transported to the surface by applying positive pressure to the lysimeter through a second tube. The pore water is collected in a collection tube and the resulting ET value is noted every day periodically. Also, the ET value for each experimental group (pots), are measured by weighing the pots daily. ET1 (day 1), ET2 (day 2), ET3 (day 3), etc. preferably calculated in grams, and an average score may be formulated as g/cm$^3$.

5) Water Content of Soil (SWC): Water content of soil is followed and recorded daily by using a Pencil tensiometers and a Tensicorder (SMS, US). The following formula is used to calculate water pressure:

$$P=A-\Psi-h,$$

where pressure (P) is equal to atmospheric pressure, and h is height (cm).

6) Plant Growth Parameters: Rate of plant root and leaf growth and total dry mass are measured from each treatment. Then they are compared with the control plants during plant growth period. Soil bulk electrical conductivity (EC), in addition to volumetric water content (VWC) (0 to 100%) and soil temperature are recorded daily by a soil sensor EC-5 (Decagon Devices, US). The following equation is used to calculate the VWC value according to the suppliers' suggestions:

$$\theta=1.3\times10^{-3}*RAW-0.696\ (RAW\ \text{is output of}\ EC\text{-5sensor})$$

7) Water absorbency (WA): A water absorbance value is analyzed to assess the water holding capacity of each SARs. For this purpose, the following equation is used (Bai et al 2010):

$$WA=(M3-M2-M1)/M1$$

Where, M1=SAP samples, M2=Mass of sieves, M3=Mass of sieves and SARs. See Bai, W., Zhang, H., Liu, B., Wu, Y., & Song, J. (2010). "Effects of super-absorbent polymers on the physical and chemical properties of soil following different wetting and drying cycles," *Soil Use and Management,* 26(3), 253-260—incorporated herein by reference in its entirety.

8) Chlorophyll Content: Chlorophyll a, chlorophyll b, and total chlorophyll are extracted by non-maceration of tissue using dimethylsulphoxide (DMSO) by the method of Hiscox and Israelstam (1979). See Hiscox, J. T., & Israelstam, G. F. (1979). "A method for the extraction of chlorophyll from leaf tissue without maceration," Canadian Journal of Botany, 57(12), 1332-1334. Absorbance values are taken at 645 and 663 nm on a spectrophotometer (Powerwave XS, Biotek). Chlorophyll content is calculated by the method of Arnon (1949), using the equation below:

$$\text{Chlorophyll}\ a\ (mg\ g^{-1}fw)=[(12.7\times OD_{663})-(2.69\times OD_{645})]\times(V\times10)/(1000\times w\times d) \quad (2)$$

$$\text{Chlorophyll}\ b\ (mg\ g^{-1}fw)=[(22.9\times OD_{645})-(4.68\times OD_{663})]\times(V\times10)/(1000\times w\times d) \quad (3)$$

Where V=Volume of the extract, and W=Weight of the tissue taken. See Arnon, D. I. (1949), "Copper enzymes in isolated chloroplasts. Polyphenoloxidase in *Beta vulgaris,*" *Plant Physiology,* 24(1), 1—incorporated herein by reference in its entirety.

Example 4

Experimental

Materials

Cellulose (Cel) was purchased from Carl Roth; potassium persulfate ($K_2S_2O_8$), acrylic acid (AA), acrylamide (AM), sodium hydroxide (NaOH), and sodium chloride (NaCl) were supplied from Merck. Bis[2-(methacryloyloxy)ethyl] phosphate was received from Sigma-Aldrich.

Distilled water was utilized in the preparation of the SAR and swelling measurements. The SAR may also be abbreviated as Cel\PAA/PAM/Poz, where Poz is pozzolan.

Figure 3:
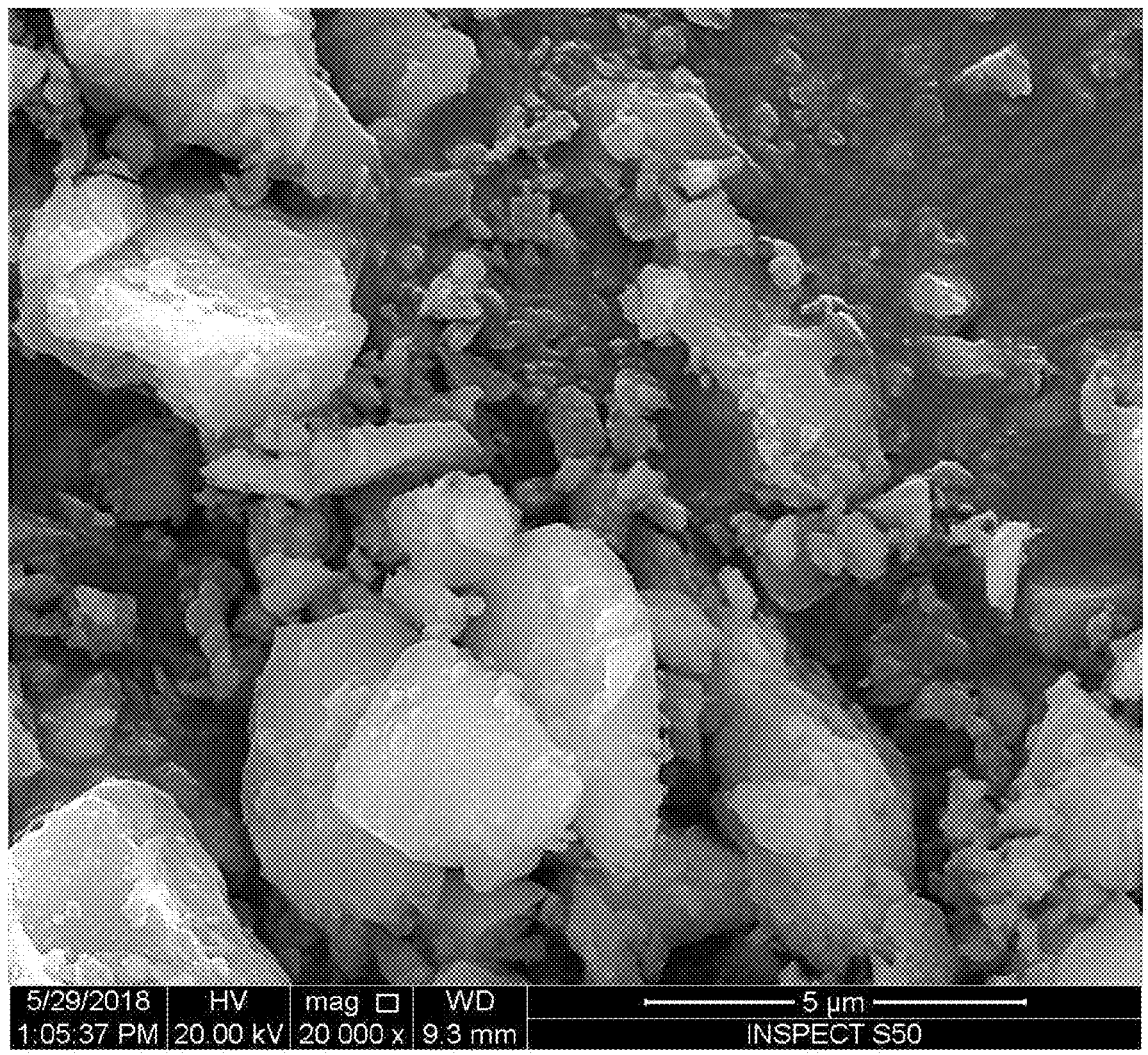
FIG. 3 is an SEM image of the pozzolan used in the SAR composite.

Preparation of Cel\PAA/PAM/Poz 2.0 g acrylic acid was mixed with 10 mL water and adjusted to a pH of 7.0 with addition of NaOH solution. The mixture was then added to a three-necked flask equipped with a stirrer. 2 g of acrylamide and 2.5 grams of pozzolan were added in this mixture and mixed. Argon gas was bubbling for 3 minutes. The flask was placed in water bath kept at a temperature of 55° C. Then 0.2 g Bis[2-(methacryloyloxy)ethyl]phosphate as a crosslinker and 0.38 g $K_2S_2O_8$ as a initiator were added into the flask to initiate the reaction, and the mixture was stirred for 4 hours. Acrylic acid, acrylamide pozzolan were adequately polymerized. Finally, the resulting product was obtained after 4 h reaction; the formed samples were dried in a 75° C. oven, milled, and sifted Characterization—SEM FIG. 3 is an SEM image of the pozzolan used in the experiments. This SEM image indicates that the crushed pozzolan having particle sizes within 1-5 μm range were used for SAR preparation.

Figure 4:
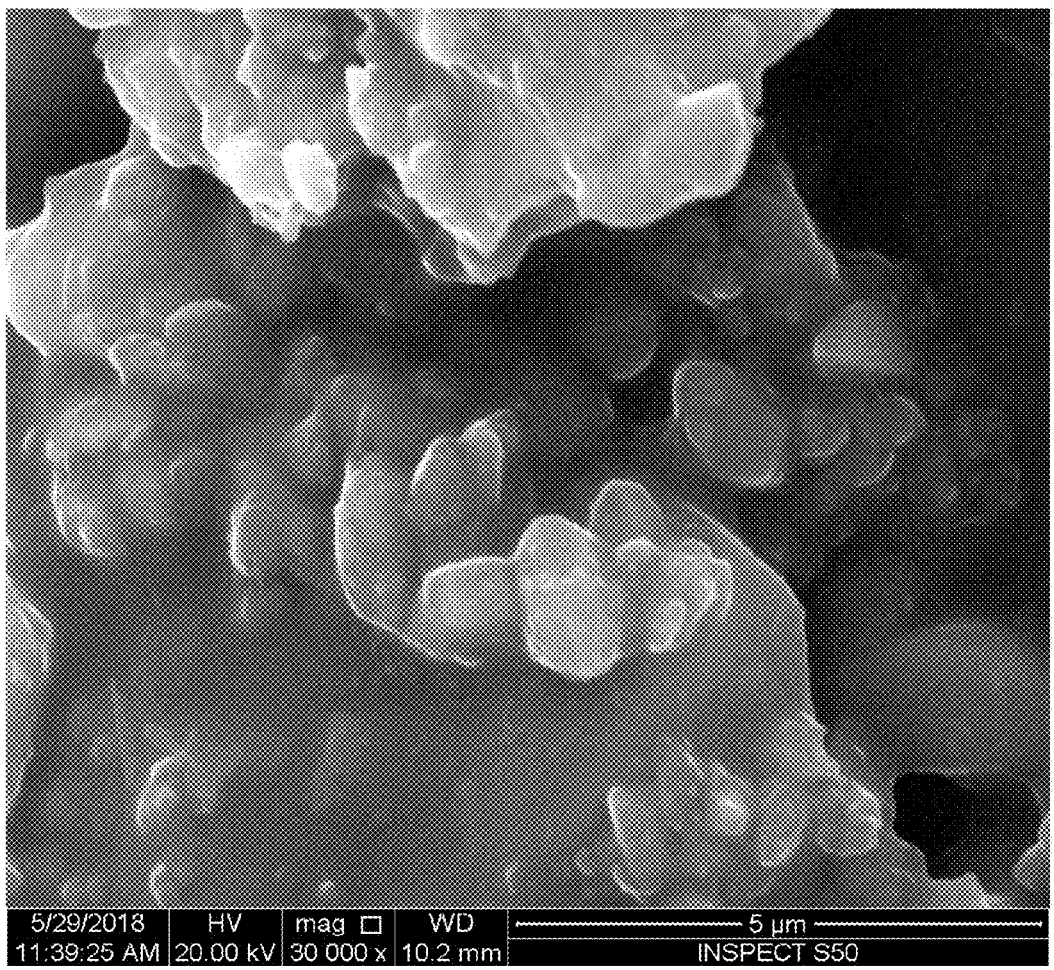
FIG. 4 is an SEM image of the Poli-11 sample.

FIG. 4 is an SEM image of the Poli-11 sample, and pozzolan particles can be seen easily, embedded in the polymer matrix.

Figure 5:
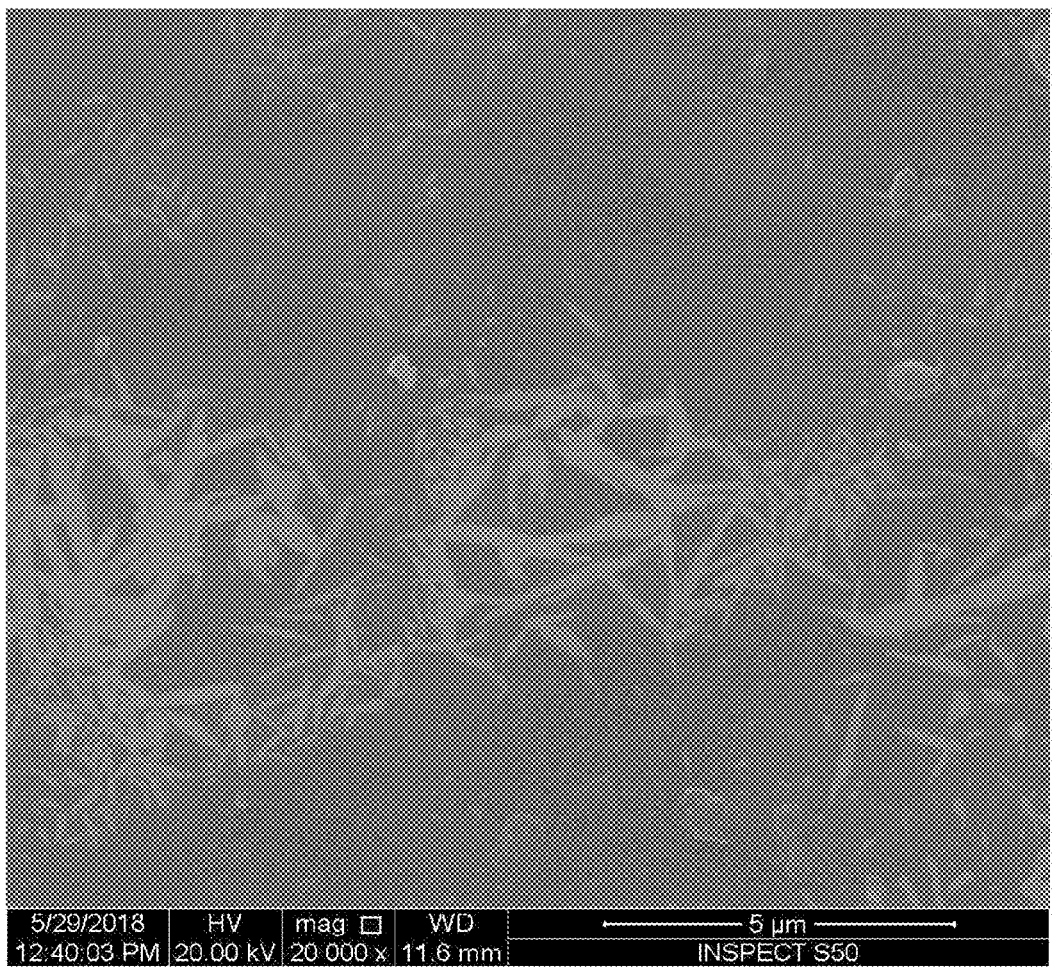
FIG. 5 is an SEM image of the Poli-16 sample.

FIG. 5 is an SEM image of the Poli-16 sample, which is the preferred composition. It has very interesting and different surface morphology where the surface is very smooth and the particles are also homogeneously dispersed. Also it seems that the additive (pozzolan) is better intercalated in the polymer matrix.

Figure 6:
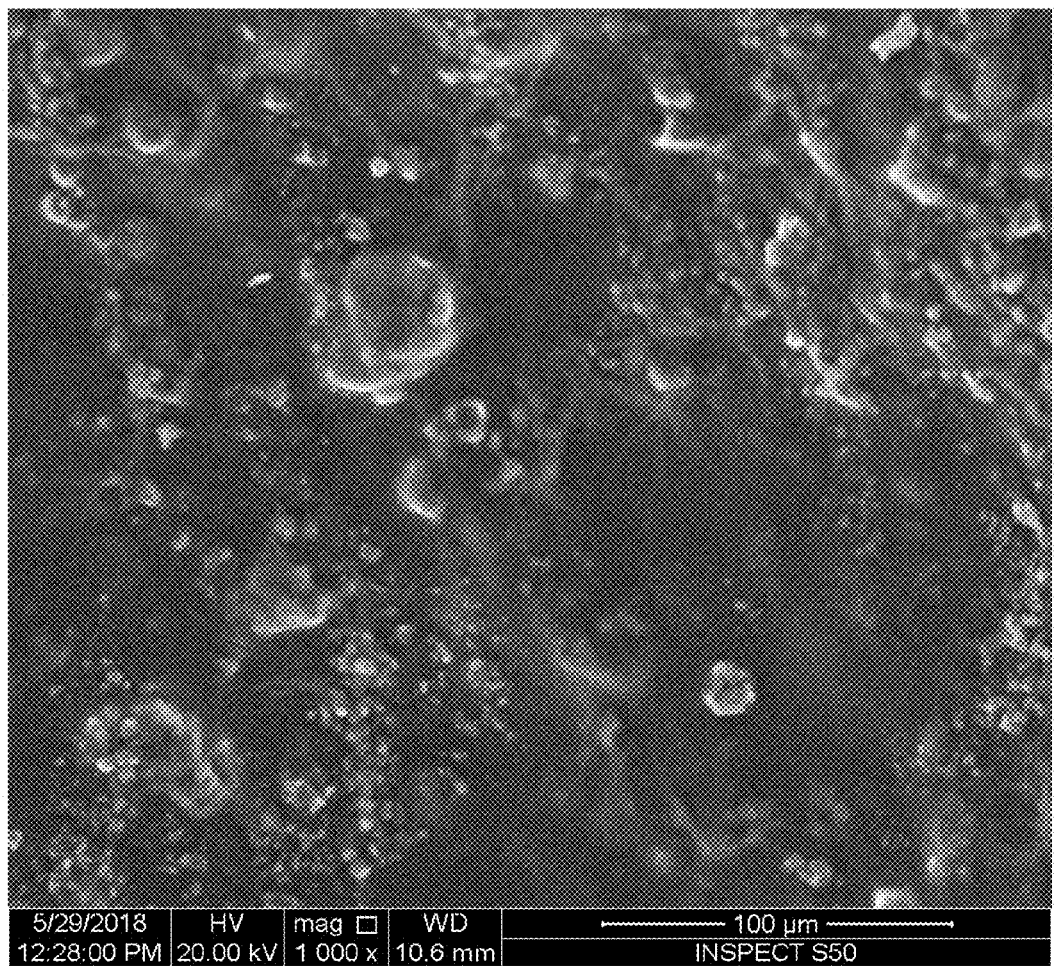
FIG. 6 is an SEM image of the Poli-14 sample.

FIG. 6 is an SEM image of the Poli-14 sample. It has a surface morphology similar to that of the Poli-11 sample (FIG. 4).

Characterization—Brunauer-Emmett-Teller (BET) Analysis

Physical properties, such as surface area, pore volume, and pore size of both pozzolan itself and the preferred SAR composition (Poli 16) are shown in Table 1 below. This table clearly implies that surface area, pore volume, and pore size of the preferred SAR combination are higher than those of the pozzolan itself, 11%, 20%, and 64%, respectively.

TABLE 1

BET Analysis results of Pozzolan and the preferred SAR combination (Poli 16)

| Brunauer-Emmett-Teller (BET) Analysis parameters | Pozzolan | Preferred SAR composition (Poli 16) |
| --- | --- | --- |
| BJH method cumulative adsorption surface area | 3.403 m²/g | 3.777 m²/g |
| BJH method cumulative adsorption pore volume | 6.783×10⁻³ cm³/g | 8.143×10⁻³ cm³/g |
| BJH method adsorption pore Radius | 1.635 nm | 2.674 nm |

Characterization—Fourier Transform Infrared Spectroscopy (FT-IR)

Fourier transform infrared spectroscopy (FT-IR) of pozzolan and prepared Cel\PAA/PAM/Poz were obtained from a Perkin Elmer series FTIR spectrometer. The thermo gravimetric analysis (TGA) of samples was conducted on an analyzer under $N_2$ atmosphere, and the temperature heated up from 25° C. to 650° C. at a rate of 10° C./min.

Figure 7:
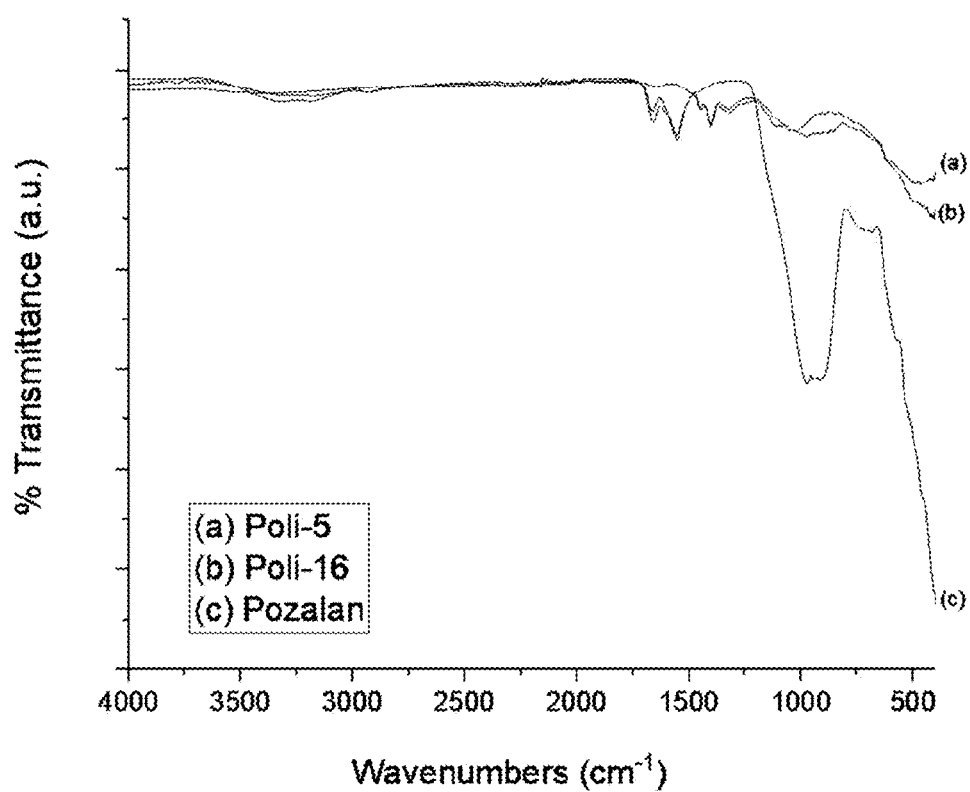
FIG. 7 is a plot of FTIR spectra for Poli-5, Poli-16, and pozzolan samples.

FIG. 7, traces (a) and (b) show strong absorption peaks at 3263 cm⁻¹ and 1663 cm⁻¹ which can be attributed to the presence of NH and C=O groups, respectively. The peak at 1393 cm⁻¹ is attributed to C—N stretching in polyacrylamide. The peak at 1000 cm⁻¹ from pozzolan as shown FIG. 6, trace (c).

Characterization—Thermogravimetric Analysis (TGA)

Figure 8:
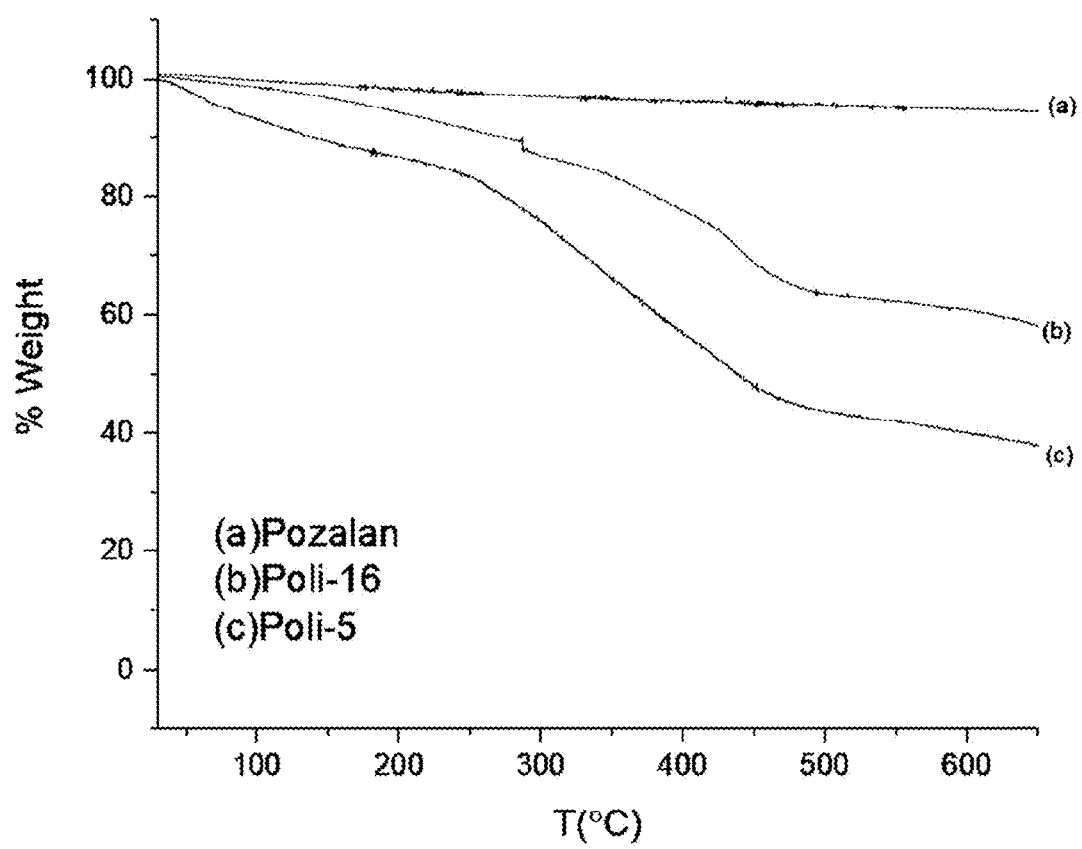
FIG. 8 is thermogravimetric analysis plot of Poli-5, Poli-16, and pozzolan samples.

FIG. 8 shows the thermograms of pozzolan (a), Poli-16 (b), and Poli-5 (c). It is clear that pozzolan has no thermal degradation up to 650° C. The composite samples have an elusive weight change up to 200° C. due to loss of humidity, and above 250° C. the degradation of polymers occurs.

Water Absorption Measurements

The pre-weighted dry SAR was immersed in excessive distilled/saline water and kept undisturbed for 10 h at room temperature until equilibrium swelling was reached. This step was performed for each SAR combination. After weighing the swollen SAR, the water absorbance (Q (g/g)) can be calculated by using the following equation:

$$Q(g/g) = (w_2 - w_1)/w_1$$

where; Q is the water absorbance defined as grams of water absorbed by per gram of SAR; $w_1$ is the mass of SAR before swelling, and $w_2$ is the mass of SAR after swelling.

Taguchi Design Analysis

Parameters affecting the water uptake of Cel\PAA/PAM/Poz, such as the weight compositions of acrylic acid, acrylamide, cellulose, and pozzolan were investigated for water uptake capability.

A Taguchi design, or an orthogonal array, is a method of designing experiments that usually requires only a fraction of the full factorial combinations. The most significant step in the design is the selection of a suitable orthogonal array that depends on the number of control factors and their levels.

In our Taguchi design, the levels of the selected four factors are summarized and shown in Table 2. A total of 9 experiments were carried out by following the Taguchi design matrix based on L9 orthogonal array. Each experiment of the design matrix was carried out at least in duplicate. Average values were put into response data set while analyzing Taguchi design. MINITAB® (Ver. 16) statistical software package was used while building and analyzing the Taguchi design of this study. The statistical evaluation of the main effects and interactions was done by analysis of variance (ANOVA). The Taguchi design experiments are shown again in Table 5 with other samples.

TABLE 2

Taguchi Experimental Design Matrix

| Experiment # | Experiment Name | Acrylic Acid (g) | Acrylamide (g) | Cellulose (g) | Pozzolan (g) |
| --- | --- | --- | --- | --- | --- |
| 1 | Poli-9  | 1   | 0 | 0 | 1   |
| 2 | Poli-10 | 1   | 1 | 1 | 2   |
| 3 | Poli-11 | 1   | 2 | 2 | 2.5 |
| 4 | Poli-12 | 1.5 | 0 | 1 | 2.5 |
| 5 | Poli-13 | 1.5 | 1 | 2 | 1   |
| 6 | Poli-14 | 1.5 | 2 | 0 | 2   |
| 7 | Poli-15 | 2   | 0 | 2 | 2   |
| 8 | Poli-16 | 2   | 1 | 0 | 2.5 |
| 9 | Poli-5  | 2   | 2 | 1 | 1   |

Outputs of Taguchi Design Analysis

The magnitude of the degrees of freedom (DF), sequential sum of squares (Seq SS), adjusted sum of squares (Adj SS), and adjusted mean squares (Adj MS) based on ANOVA results are shown in Table 3. The Percent effects of each parameter were calculated by dividing the Adj MS of each parameter by the total Adj MS.

According to these results, it can be concluded that the effects of acrylamide, acrylic acid, and cellulose content on maximizing the water uptake capability are very important with the values of 34.1, 32.1, and 29.7%, respectively. The effect of pozzolan among others was calculated as 4.08%.

Figure 9:
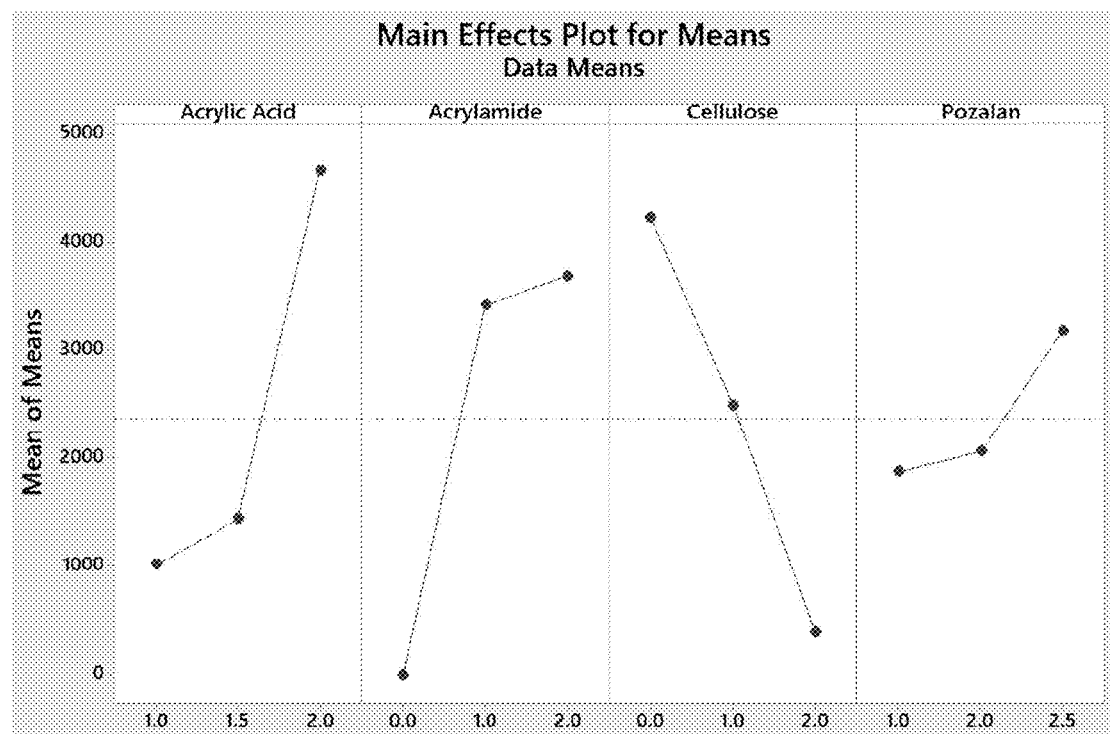
FIG. 9 is a main effects plot for distilled water.

The significance of the factors can be better understood in the main effect plots in which the response mean for each level is connected by a line for each factor (FIG. 9). The steeper slope of the line means the greater the magnitude of the main effect, as we see in the graphs for acrylic acid, acrylamide, and pozzolan. These three materials have a positive effect on the water uptake. On the other hand, the response mean decreases as the cellulose weight increases, meaning that cellulose has a negative effect on the water uptake. The highest water uptake was provided by excluding cellulose from the mixture.

TABLE 3

Analysis of Variance for Means (Distilled Water)

| Source | DF | Seq SS | Adj SS | Adj MS | % Effect |
|---|---|---|---|---|---|
| AA | 2 | 23874492 | 23874492 | 11937246 | 32.1 |
| AM | 2 | 25338705 | 25338705 | 12669353 | 34.1 |
| Cel | 2 | 22111935 | 22111935 | 11055967 | 29.7 |
| Poz | 2 | 3032819 | 3032819 | 1516409 | 4.08 |
| Total | 8 | 74357951 | | 37178975 | 100 |

The same analysis procedure was applied to saline water having 0.9% NaCl (v/v). The effects of acrylamide, cellulose, and acrylic acid content on the water uptake capability are very important with percent effect values of 38.2, 30.8, and 27.6%, respectively. The effect of Pozzolan among others was calculated as 3.43% (Table 4).

Figure 10:
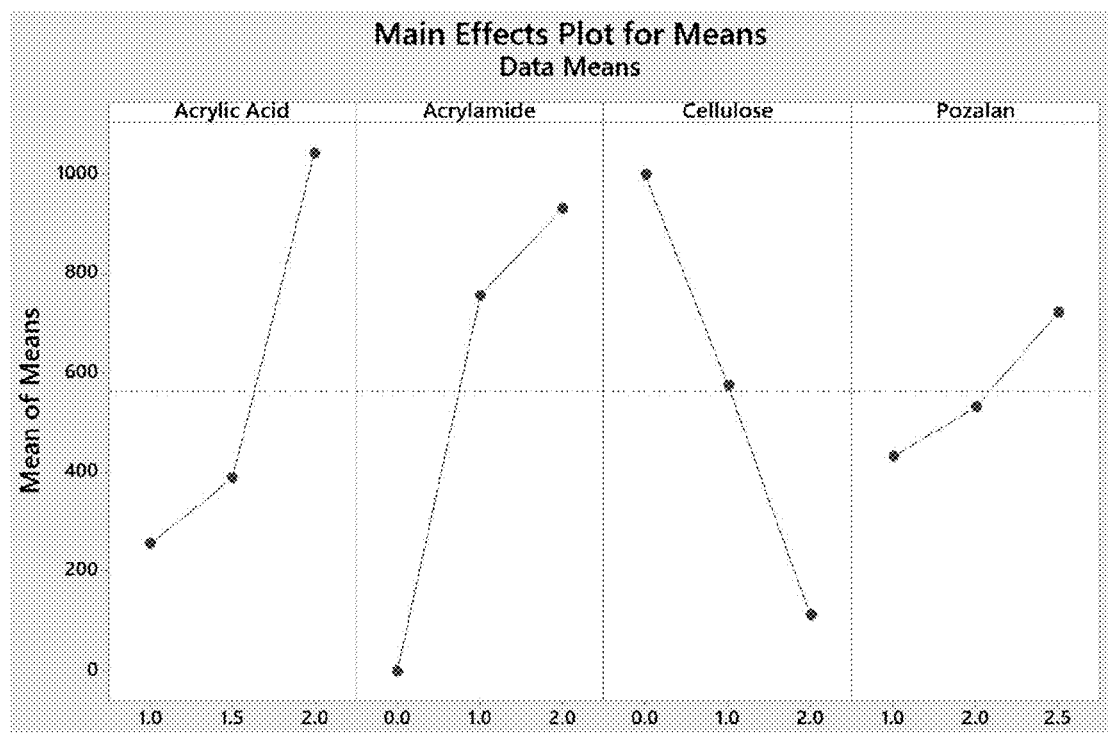
FIG. 10 is a main effects plot for saline made with distilled water.

As it can be inferred from the FIG. 10, the acrylic acid, acrylamide, and pozzolan each have a positive effect on the saline water uptake. On the other hand, the response mean decreased as the cellulose weight increased, meaning that cellulose has a negative effect on the saline water uptake. The highest saline water uptake was provided by excluding cellulose from the mixture.

TABLE 4

Analysis of Variance for Means (Saline Water)

| Source | DF | Seq SS | Adj SS | Adj MS | % Effect |
|---|---|---|---|---|---|
| Acrylic Acid | 2 | 1060754 | 1060754 | 530377 | 27.6 |
| Acrylamide | 2 | 1467448 | 1467448 | 733724 | 38.2 |
| Cellulose | 2 | 1181868 | 1181868 | 590934 | 30.8 |
| Pozzolan | 2 | 131710 | 131710 | 65855 | 3.43 |
| Total | 8 | 3841779 | | 1920890 | 100 |

Application to Distilled Water and Saline Water

Figure 11:
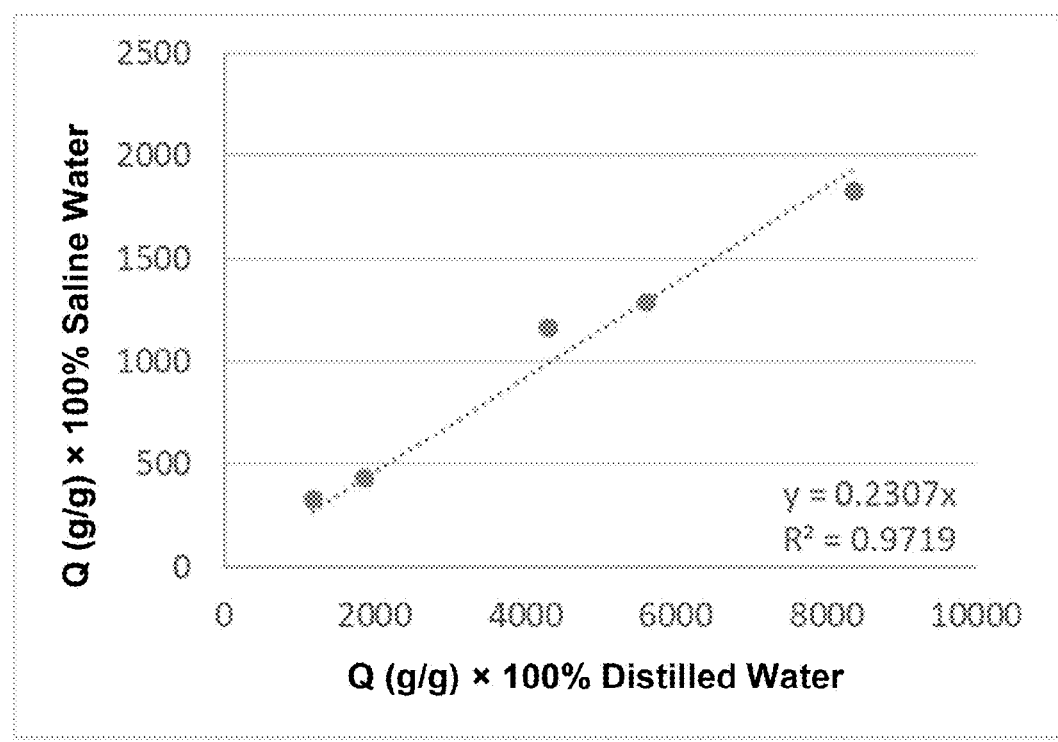
FIG. 11 is a plot showing the correlation of Cel\PAA/PAM/Poz application to distilled water and saline water.

Cel\PAA/PAM/Poz application to distilled water and saline water were compared (FIG. 11). Cel\PAA/PAM/Poz can uptake distilled water at an amount 4.07 times (±0.413) higher than that of saline water. The Pearson coefficient of correlation between saline water and distilled water uptake was found to be 0.986, which can be considered as a strong correlation.

Effect of Weight Ratios of Cel\PAA/PAM/Poz

The changes of water absorbency within the weight % of each material in total weight were investigated. The compositions and results for each sample are summarized in Table 5.

TABLE 5

SAR combinations in Preliminary and Taguchi design experiments and water absorbance results.

| Experiment | Acrylic Acid (g) | Acrylamide (g) | Cellulose (g) | Pozzolan (g) | Q, (g/g)* 100% |
|---|---|---|---|---|---|
| P1 | 2.0 | 2.0 | 1.0 | 0.0 | 1724 |
| P2 | 2.0 | 2.0 | 0.2 | 0.0 | 5650 |
| P3 | 2.0 | 2.0 | 0.2 | 0.5 | 3108 |
| P4 | 2.0 | 2.0 | 0.5 | 1.0 | 5600 |
| P5 | 2.0 | 2.0 | 1.0 | 1.5 | 2439 |
| P6 | 2.0 | 2.0 | 1.0 | 2.0 | 2912 |
| T1 | 1.0 | 0.0 | 0.0 | 1.0 | 0* |
| T2 | 1.0 | 1.0 | 1.0 | 2.0 | 1870 |
| T3 | 1.0 | 2.0 | 2.0 | 2.5 | 1169 |
| T4 | 1.5 | 0.0 | 1.0 | 2.5 | 0* |
| T5 | 1.5 | 1.0 | 2.0 | 1.0 | 0* |
| T6 | 1.5 | 2.0 | 0.0 | 2.0 | 4295 |
| T7 | 2.0 | 0.0 | 2.0 | 2.0 | 0* |
| T8 | 2.0 | 1.0 | 0.0 | 2.5 | 8375 |
| T9 | 2.0 | 2.0 | 1.0 | 1.0 | 5600 |

P: Preliminary experiments, T: Taguchi design experiments. *: SAR composite dispersed in water. Water absorption could not be detected.

Figure 12:
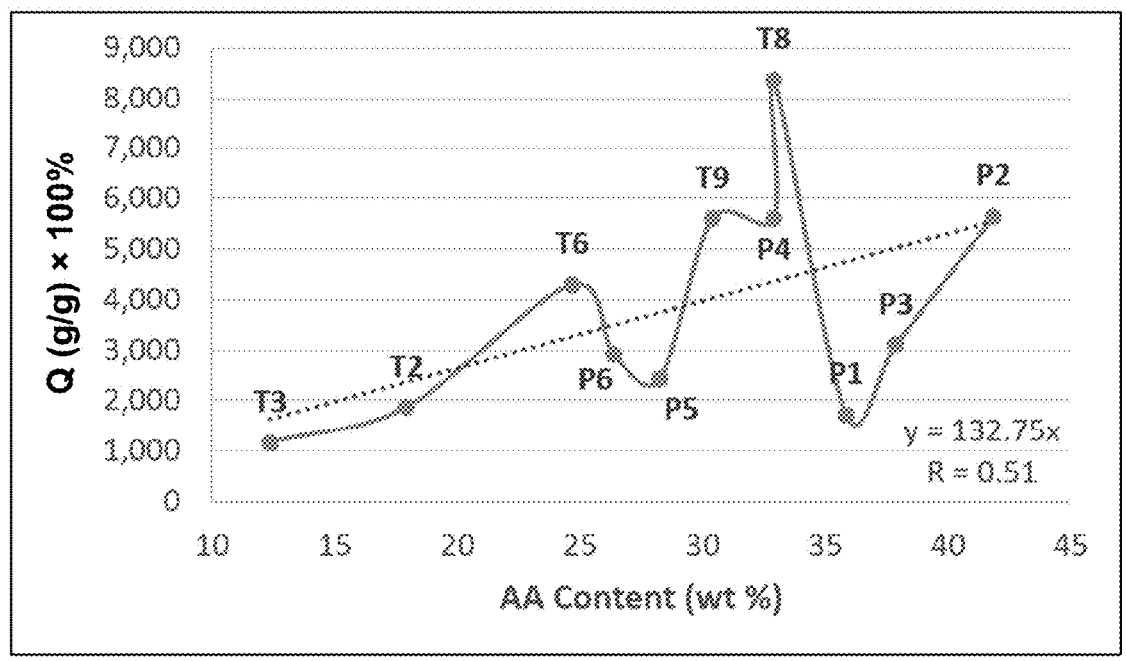
FIG. 12 is a plot showing the effect of AA content on water uptake.

Results showed that the water absorbency increased as AA content increased (FIG. 12). This result proves the output of Taguchi design analysis. The Pearson coefficient was found to be 0.51 for the correlation between water uptake and AA content. An advantageous AA weight in the mixture would be 2 mL.

Figure 13:
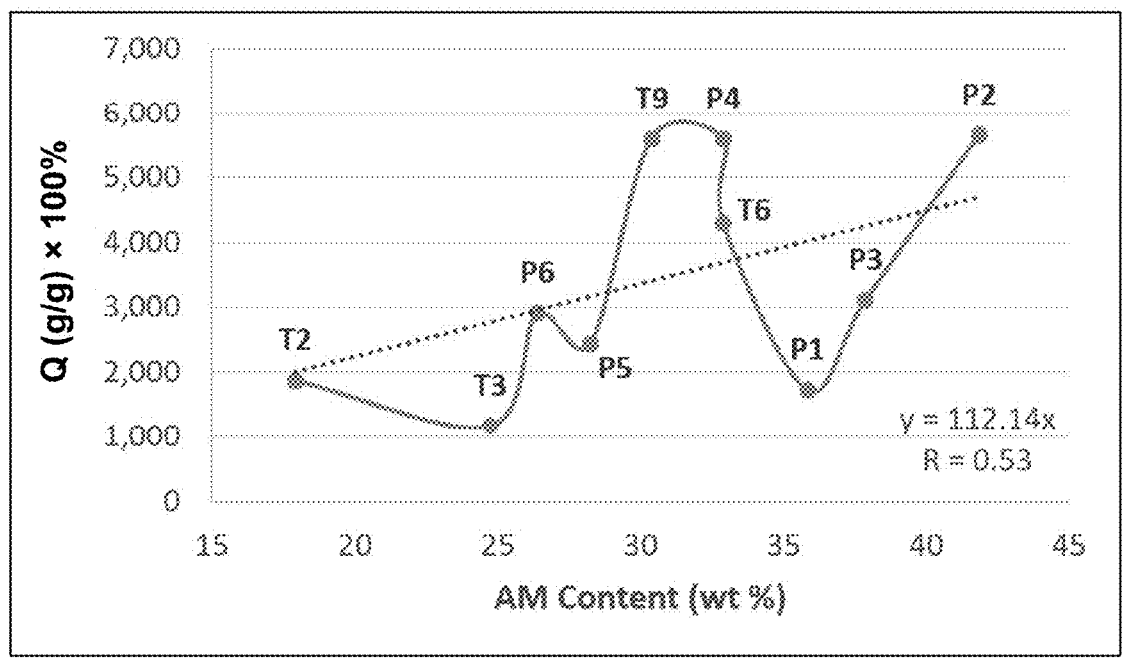
FIG. 13 is a plot showing the effect of AM content on water uptake.

It can be concluded from FIG. 13 that the water absorbency increased as AM content increased. This result also proves the outputs of Taguchi design analysis. The Pearson coefficient was found to be 0.53 for the correlation between water uptake and AM content. An advantageous AM weight in the mixture can be suggested as 2 g.

Figure 14:
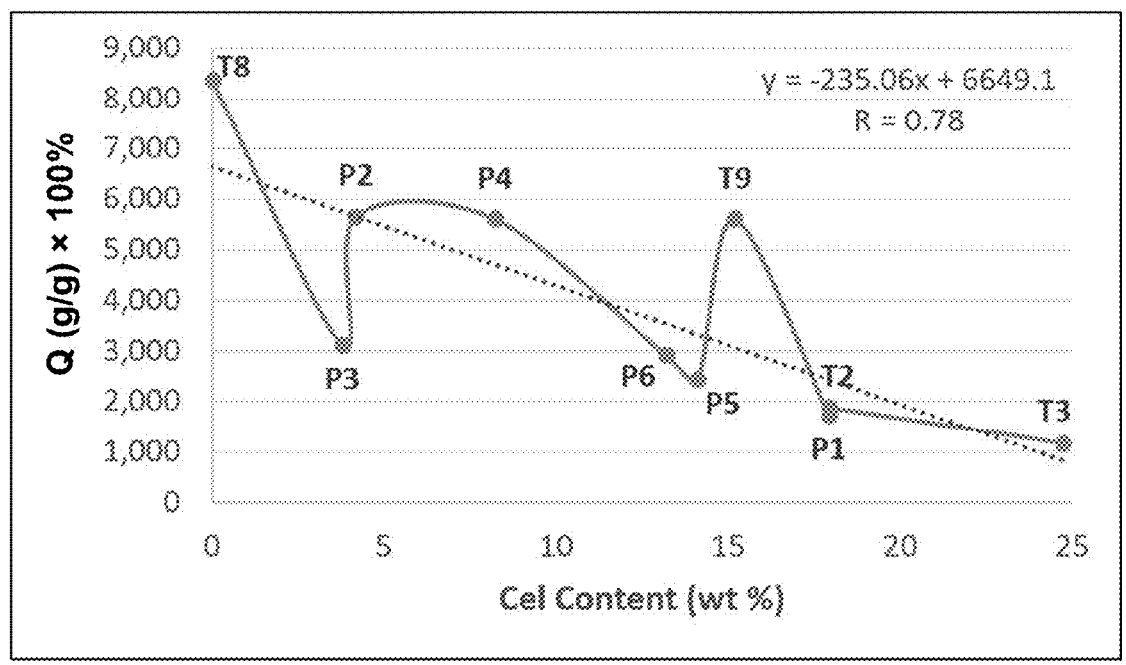
FIG. 14 is a plot showing the effect of Cel content on water uptake.

FIG. 14 indicates that the water absorbency decreased as Cel content increased, which can also be verified by the Taguchi design analysis. The Pearson coefficient was found to be −0.78 for the negative correlation between water uptake and Cel content. These results suggest excluding Cel material from the mixture.

Figure 15:
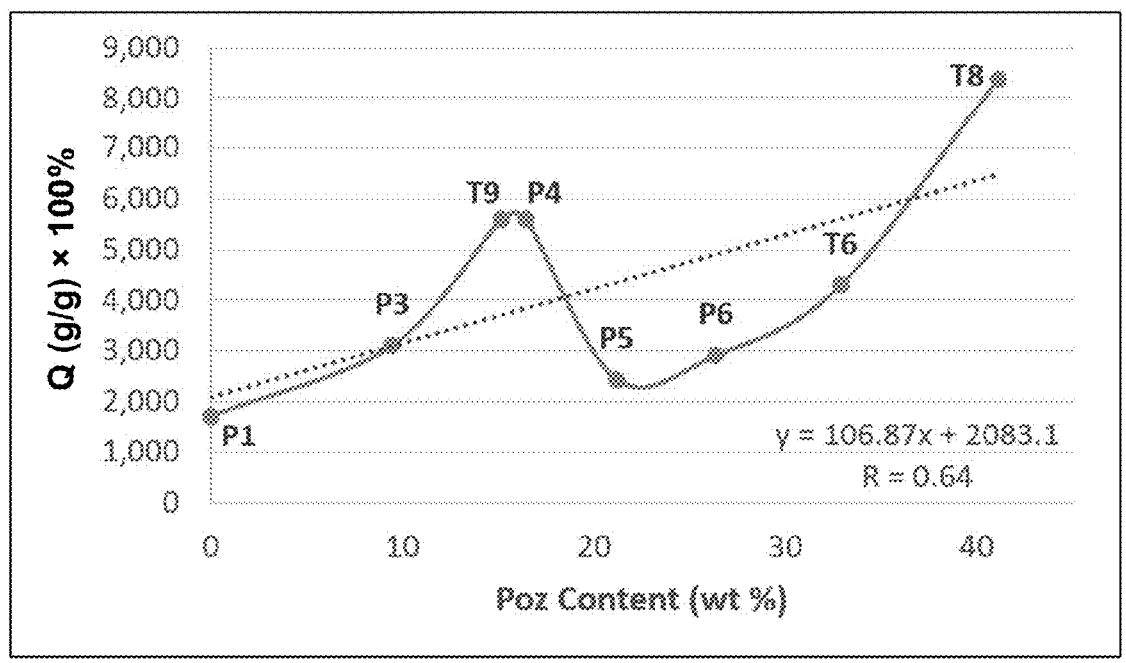
FIG. 15 is a plot showing the effect of Poz content on water uptake.

It can be seen from FIG. 15 that the water absorbency increased as Poz content increased. This result also proves the outputs of Taguchi design analysis. The Pearson coefficient was found to be 0.64 for the correlation between water uptake and Poz content. An advantageous Poz weight in the mixture can be suggested as 2.5 g.

Even though the percent effect of pozzolan on the water uptake seems to be less (4.08%) than others, the recommended pozzolan weight in the mixture corresponds to 35-40% of the total mass. The pozzolan is a locally available material and very inexpensive. The usage of this pozzolan will reduce the cost of PAA/PAM/Poz mixture dramatically. In addition to this, pozzolan is a natural material and increasing its usage will provide sustainable solutions for soil water uptake applications.

The invention claimed is:

1. A method of improving water retention in a soil, the method comprising:
   mixing a super absorbing resin (SAR) composite with the soil,
   wherein the SAR composite comprises:
   a fibrous base material,
   a natural pozzolan, and
   at least one polymer or copolymer selected from the group consisting of chitosan-alginic acid, chitosan, poly 2-acrylamido-2-methylpropane-sulfonic acid (polyAMPS), polyacrylamide, polyacrylic acid, and sodium alginate,
   wherein a mixture of the natural pozzolan and the at least one polymer is present on the fibrous base material;
   wherein the SAR composite is present at a weight percentage of 0.1-5.0 wt % relative to a weight of the soil.

2. The method of claim 1, wherein the SAR composite comprises:
   30-40 wt % polyacrylic acid;
   10-25 wt % polyacrylamide; and
   40-50 wt % natural pozzolan, each relative to a total weight of the polyacrylic acid, polyacrylamide, and natural pozzolan.

3. The method of claim 1, wherein the natural pozzolan is at least one selected from the group consisting of metakaolin, calcined shale, calcined clay, volcanic glass, zeolitic trass, zeolitic tuff, tuffs, rice husk ash, diatomaceous earth, and calcined shale.

4. A method of improving water retention in a soil, the method comprising:
   mixing a super absorbing resin (SAR) composite with the soil,
   wherein the SAR composite comprises:
   a fibrous base material,
   a natural pozzolan, and
   at least one polymer or copolymer selected from the group consisting of chitosan-alginic acid, chitosan, poly 2-acrylamido-2-methylpropane-sulfonic acid (polyAMPS), polyacrylamide, polyacrylic acid, and sodium alginate,
   wherein a mixture of the natural pozzolan and the at least one polymer is present on the fibrous base material;
   wherein the SAR composite further comprises water at a weight percentage of 20-80 wt % relative to a total weight of the SAR composite dry weight and water.

5. The method of claim 1, wherein the SAR composite releases water at an average rate of 5-90 mL water per kg SAR composite per day.

6. A method of improving water retention in a soil, the method comprising:
   mixing a super absorbing resin (SAR) composite with the soil,
   wherein the SAR composite comprises:
   a fibrous base material,
   a natural pozzolan, and
   at least one polymer or copolymer selected from the group consisting of chitosan-alginic acid, chitosan, poly 2-acrylamido-2-methylpropane-sulfonic acid (polyAMPS), polyacrylamide, polyacrylic acid, and sodium alginate,
   wherein a mixture of the natural pozzolan and the at least one polymer is present on the fibrous base material;
   wherein the at least one polymer or copolymer is cross-linked and has a cross-link density of 100-5,000 mol/cm$^3$.

7. The method of claim 1, wherein the SAR composite further comprises at least one selected from the group consisting of a plant fertilizer, a mineral, a plant growth hormone, a pesticide, and a fungicide.

8. The method of claim 7, wherein the SAR composite releases water and the at least one plant fertilizer, mineral, plant growth hormone, pesticide, or fungicide at an average rate of 5-90 mL water per kg SAR composite per day.

9. The method of claim 1, wherein the SAR composite further comprises a zeolite.

10. The method of claim 1, wherein the SAR composite further comprises a layered double hydroxide.

11. The method of claim 4, wherein the SAR composite comprises:
    30-40 wt % polyacrylic acid;
    10-25 wt % polyacrylamide; and
    40-50 wt % natural pozzolan, each relative to a total weight of the polyacrylic acid, polyacrylamide, and natural pozzolan.

12. The method of claim 4, wherein the natural pozzolan is at least one selected from the group consisting of metakaolin, calcined shale, calcined clay, volcanic glass, zeolitic trass, zeolitic tuff, tuffs, rice husk ash, diatomaceous earth, and calcined shale.

13. The method of claim 4, wherein the SAR composite further comprises at least one selected from the group consisting of a plant fertilizer, a mineral, a plant growth hormone, a pesticide, and a fungicide.

14. The method of claim 4, wherein the SAR composite further comprises a zeolite.

15. The method of claim 6, wherein the SAR composite comprises:
    30-40 wt % polyacrylic acid;
    10-25 wt % polyacrylamide; and
    40-50 wt % natural pozzolan, each relative to a total weight of the polyacrylic acid, polyacrylamide, and natural pozzolan.

16. The method of claim 6, wherein the natural pozzolan is at least one selected from the group consisting of metakaolin, calcined shale, calcined clay, volcanic glass, zeolitic trass, zeolitic tuff, tuffs, rice husk ash, diatomaceous earth, and calcined shale.

17. The method of claim 6, wherein the SAR composite further comprises at least one selected from the group consisting of a plant fertilizer, a mineral, a plant growth hormone, a pesticide, and a fungicide.

18. The method of claim 6, wherein the SAR composite further comprises a zeolite.

* * * * *